United States Patent
Gassman

(10) Patent No.: US 11,368,120 B2
(45) Date of Patent: Jun. 21, 2022

(54) FEATURE SET AND METHODS FOR A DIGITAL POSITIONER

(71) Applicant: FISHER CONTROLS INTERNATIONAL LLC, Marshalltown, IA (US)

(72) Inventor: George W. Gassman, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 50 days.

(21) Appl. No.: 16/881,798

(22) Filed: May 22, 2020

(65) Prior Publication Data

US 2021/0367548 A1    Nov. 25, 2021

(51) Int. Cl.
*H02P 29/028* (2016.01)
*H02P 29/032* (2016.01)
*F04B 53/10* (2006.01)
*H02P 27/08* (2006.01)

(52) U.S. Cl.
CPC .......... *H02P 29/028* (2013.01); *F04B 53/108* (2013.01); *H02P 27/08* (2013.01); *H02P 29/032* (2016.02)

(58) Field of Classification Search
USPC ....................................................... 318/560
See application file for complete search history.

(56) References Cited

U.S. PATENT DOCUMENTS

| 6,349,627 | B1 | 2/2002 | Nusche |
| 9,465,391 | B2 | 10/2016 | Grumstrup et al. |
| 9,989,159 | B2 | 6/2018 | Winkler et al. |
| 2016/0273676 | A1* | 9/2016 | Junk .................... F16K 37/0083 |

FOREIGN PATENT DOCUMENTS

CN         109944844 A  *  6/2019

* cited by examiner

*Primary Examiner* — Said Bouziane
(74) *Attorney, Agent, or Firm* — Marshall, Gerstein & Borun LLP

(57) ABSTRACT

A digital positioner for a valve includes a valve controller configured to obtain a set point value for a valve travel of a valve, and generate a pulse-width modulated current signal based on the set point value. The digital positioner also includes a current-to-pressure converter configured to receive the pulse-width modulated current signal from the valve controller, convert the pulse-width modulated current signal to a pulse-width modulated pressure signal, and provide the pulse-width modulated pressure signal to a pneumatic actuator in the valve to adjust a position of the valve.

18 Claims, 18 Drawing Sheets

FEATURE SET AND METHODS FOR A DIGITAL POSITIONER

FIELD OF THE DISCLOSURE

The present disclosure relates to process control systems, and more particularly, to a digital positioner for controlling a valve in a process control system.

BACKGROUND

Industrial processing plants use control valves in a wide variety of applications from controlling process flow in petroleum refineries to maintaining fluid levels in tank farms. Control valves, which are typically automated, are used to manage such fluid flow by functioning like a variable orifice or passage. By controlling an internal valve component, such as a valve plug, the amount of product passing through the valve body can be accurately regulated. The control valve is typically automated using a pressure-operated actuator that is controlled by a remotely-operated field instrument, such as a positioner having a valve controller. The valve controller communicates with a process control computer to command fluid flow changes within the valve to achieve the plant operators' desired control strategy via pressure-operated actuators. Electropneumatic converters, such as current-to-pressure (I/P) transducers (also referred to herein as "current-to-pressure converters"), are in common use in positioners to provide a conversion of an electrical signal from the valve controller to a volumetric flow or pressure output to control the actuator and, therefore, the control valve.

The valve controller may include pressure sensors, a two-stage pneumatic amplifier system which operates in an analog manner, and a travel sensor integrated into a pneumatic relay stage to provide a damping circuit. The valve controller typically provides an analog output in the form of a continuous current signal to an electropneumatic transducer which converts the continuous current signal to a volumetric flow or pressure output. Current electropneumatic converters typically provide continuous, proportional current-to-pressure conversion. Existing continuous conversion electropneumatic converters consume or bleed air constantly during operation. High air consumption is undesirable in certain applications such as when the fluid supply to the field instrument and the electropneumatic converter is process media like natural gas. For example, the costs associated with providing additional capacity in the fluid supply system can be substantial. Additionally, the constant bleed of such process media is both expensive and wasteful to the environment. The continuous pressure signal causes the actuator to throttle, resulting in unnecessary and wasteful movement by the valve.

SUMMARY

To reduce air consumption as well as financial and environmental costs, a digital positioner includes a valve controller that generates a discrete output in the form of a pulsed or pulse-width modulated (PWM) current signal. More specifically, the valve controller may generate a rectangular pulse wave having a particular period (e.g., 0.070 seconds), where the rectangular pulse wave includes current values above a threshold maximum current level (e.g., 18 mA) at one or more time intervals within the particular period and/or current values below a threshold minimum current level (e.g., 4 mA) at one or more other time intervals within the particular period. The proportion of the period in which the current values are above the threshold maximum current level may be referred to as the duty cycle for the particular period. A duty cycle of 0% may indicate that the current values are below the threshold minimum current level for the entire period. A duty cycle of 100% may indicate that the current values are above the threshold maximum current level for the entire period. A duty cycle of 50% may indicate that the current values are above the threshold maximum current level for half of the period. To control the position of the valve, the valve controller may generate a discrete output having a particular duty cycle, where the duty cycle is proportional to the pressure provided to the valve actuator. For example, when the duty cycle is 0%, the electropneumatic converter may not provide any pressure to the actuator. When the duty cycle is 100%, the electropneumatic converter may provide a maximum amount of pressure to the actuator, and when the duty cycle is 50%, the electropneumatic converter may provide half of the maximum amount of pressure to the actuator.

The electropneumatic converter may convert the discrete, PWM current signal into a discrete, PWM pressure output. In some implementations the electropneumatic converter produces pulses of pneumatic pressure and provides zero pressure (or pressure below a threshold minimum pressure level) at one or more time intervals within a particular period and/or provides maximum pressure (or pressure above a threshold maximum pressure level) at one or more other time intervals within the particular period, in accordance with the PWM current signal. The average pressure output provided to the actuator may correspond to a combination of the duty cycle for the PWM pressure output and the maximum pressure. For example, if the maximum pressure is 20 psig and the duty cycle for the PWM pressure output is 50%, then the average pressure output may be 10 psig.

In some implementations, the valve controller may provide two PWM current signals to two electropneumatic converters. A first electropneumatic converter may provide a first PWM pressure output to a supply relay which provides the first pressure output to a supply port of the actuator. A second electropneumatic converter may provide a second PWM pressure output to an exhaust relay which vents the second pressure output from the actuator.

In this manner, the number of electronic components in the digital positioner is reduced compared to alternative positioners having amplifiers and/or additional sensors for damping. Moreover, the digital positioner stops providing pressure to the valve actuator when the valve has reached a desirable position. Thus, the valve actuator does not oscillate and the amount of air that is consumed from the electropneumatic converters is significantly reduced.

In one implementation, a digital positioner for a valve includes a valve controller configured to obtain a set point value for a valve travel of a valve, and generate a pulse-width modulated current signal based on the set point value. The digital positioner also includes a current-to-pressure converter configured to receive the pulse-width modulated current signal from the valve controller, convert the pulse-width modulated current signal to a pulse-width modulated pressure signal, and provide the pulse-width modulated pressure signal to a pneumatic actuator in the valve to adjust a position of the valve.

In another implementation, a valve controller includes one or more processors, and a non-transitory computer-readable memory storing instructions thereon. The instructions, when executed by the one or more processors, cause the valve controller to obtain a set point value for a valve travel of a valve, generate a pulse-width modulated current signal based on the set point value, and provide the pulse-width modulated current signal to a current-to-pressure converter. The current-to-pressure converter converts the pulse-width modulated current signal to a pulse-width modulated pressure signal and provides the pulse-width modulated pressure signal to a pneumatic actuator in the valve to adjust a position of the valve.

DETAILED DESCRIPTION

Figure 1:
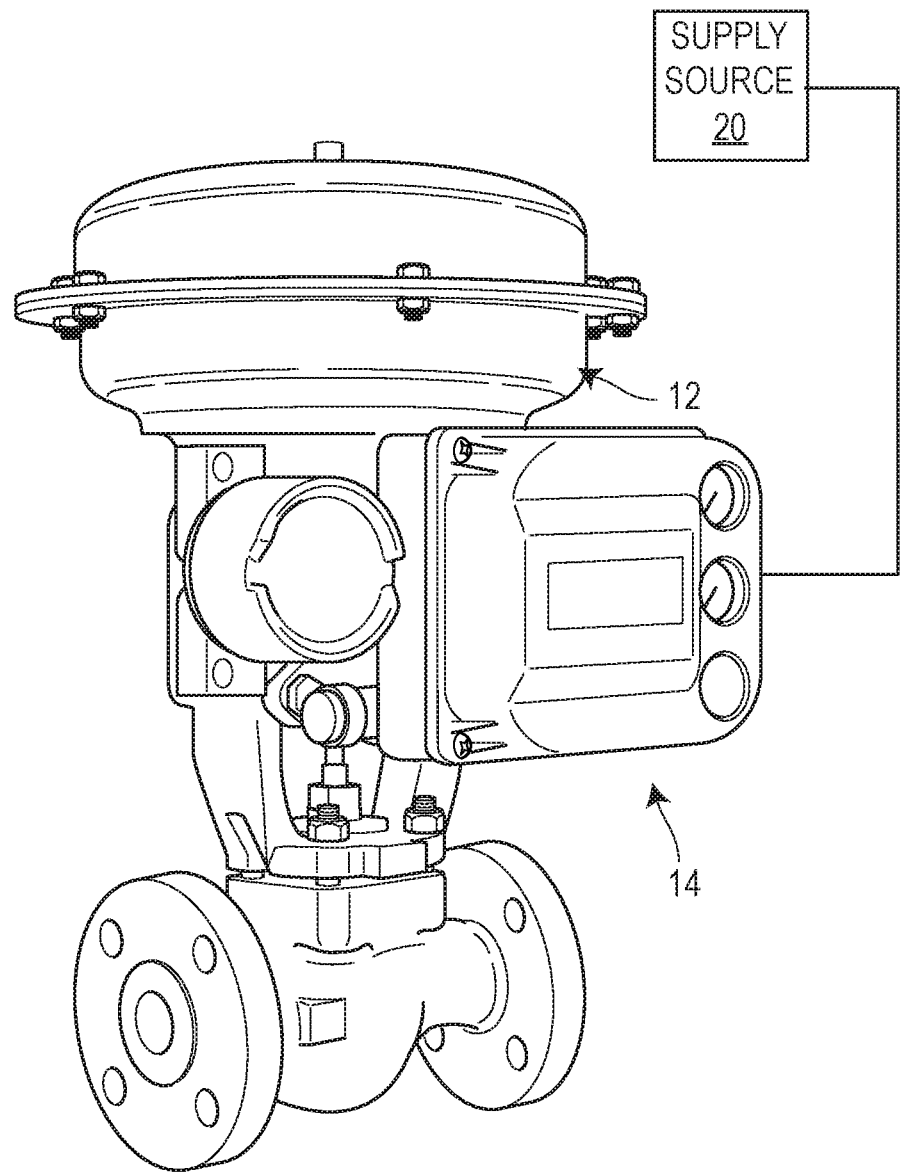
FIG. 1 is a perspective view of a digital valve positioner of the present disclosure operatively coupled to an actuator.

For the purposes of promoting an understanding of the principles of the present disclosure, reference will now be made to an example embodiment and variations thereof illustrated in the drawings and specific language used to describe the same. It will nevertheless be understood that no limitation of the scope of the disclosure is thereby intended, and such alterations and further modifications in the illustrated device and such further applications of the principles of the disclosure as illustrated as would normally occur to one skilled in the art to which the disclosure relates are included.

Generally speaking, a digital valve positioner for use with an actuator is disclosed. Referring now to FIG. 1, an exemplary digital valve positioner 14 mounted to a pneumatic valve actuator 12 (which may also be referred to herein as the "actuator 12") is depicted. The digital valve positioner 14 includes a valve controller, an I/P module or converter, and a pneumatic relay assembly including a supply relay and an exhaust relay. The digital valve positioner 14 generates a PWM current signal and converts the PWM current signal into a pneumatic output pressure to the actuator 12.

The digital valve positioner 14 may further include a porting block having two output ports and a supply port. The output ports are operatively coupled to the actuator 12 in a known manner. In some implementations, one of the output ports may provide supply flow to the actuator 12 while the other output port may receive exhaust flow from the actuator 12. Flow from the other output port may be vented to the atmosphere to an exhaust conduit that is vented to the atmosphere. In this manner, the actuator pressure may be increased by opening the supply relay to allow supply flow into the actuator 12 while simultaneously closing the exhaust relay to prevent exhaust flow from the actuator 12. The actuator pressure may be decreased by closing the supply relay to prevent supply flow into the actuator 12 while simultaneously opening the exhaust relay to allow exhaust flow from the actuator 12.

In addition, the supply port is operatively coupled to a supply source 20. The porting block may further include two exhaust ports that correspond to the output ports, respectively. In other words, each output port has a corresponding exhaust port. In addition, each exhaust port includes an exhaust port opening. The digital valve positioner 14 may also include a vent assembly that is operatively coupled to at least one exhaust port opening.

Figure 2:
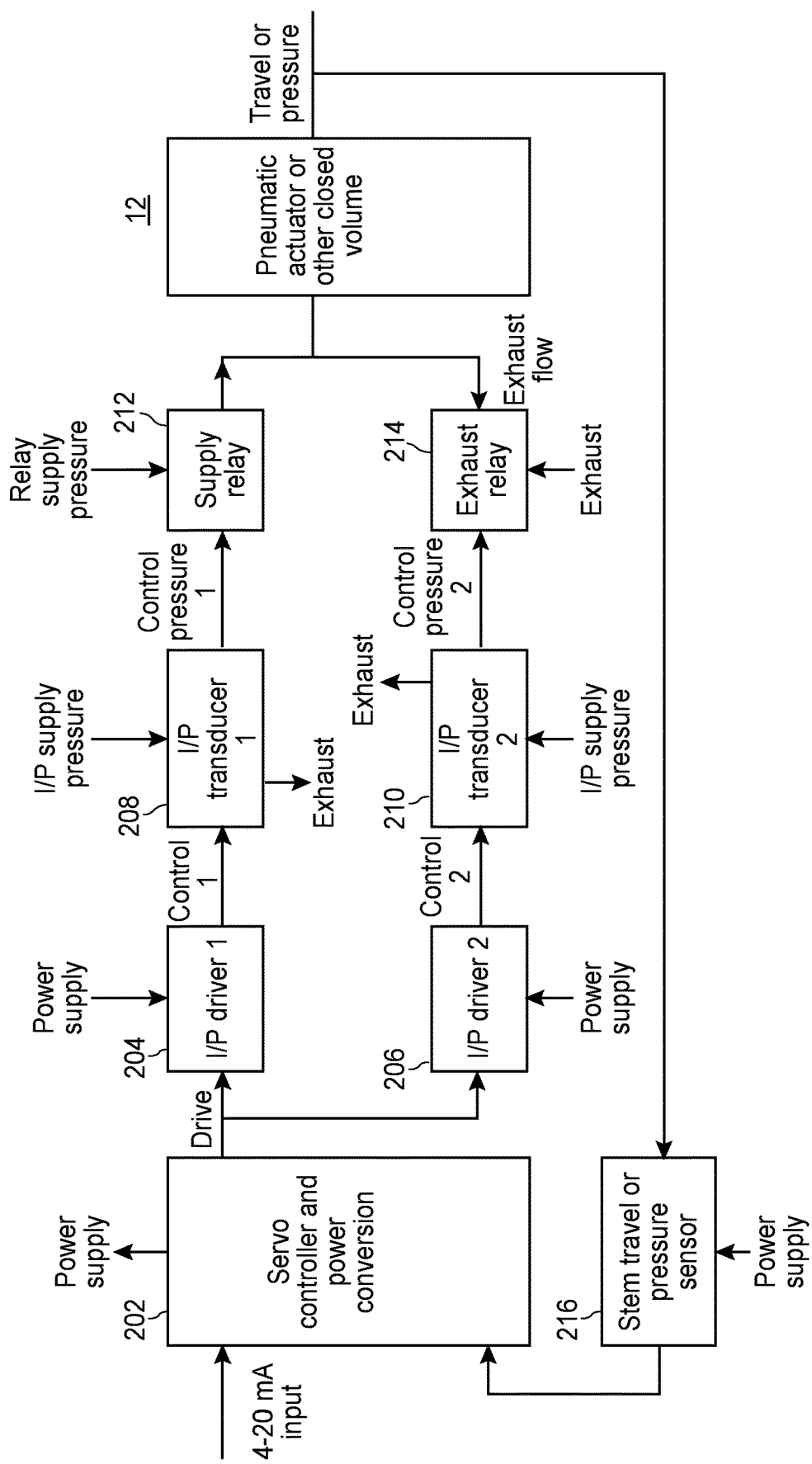
FIG. 2 is a block diagram of the components of the digital valve positioner of FIG. 1.

FIG. 2 is a block diagram of the example digital valve positioner 14 of FIG. 1. The digital valve positioner 14 includes a valve controller 202, I/P drivers 204, 206, I/P transducers 208, 210, a supply relay 212, an exhaust relay 214, and a valve travel sensor 216 configured to obtain a current valve travel value for the valve or a current pressure value in the actuator of the valve and provide the current valve travel value or the pressure value to the valve controller. The valve controller 202 includes one or more processors, a memory which can be a non-transitory memory and can include one or several suitable memory modules, such as random access memory (RAM), read-only memory (ROM), flash memory, other types of persistent memory, etc., and a communication unit to transmit and receive data via a local area network, wide area network, or any other suitable network. The memory may include an operating system and a control unit for controlling the digital positioner 14 to generate drive signals to the I/P drivers 204, 206, I/P transducers 208, 210, supply relay 212, and/or exhaust relay 214. The drive signals may be generated based on set point values, for example communicated via the communication unit from a process control computer. The drive signals may also be generated based on valve travel values or pressure values obtained from the valve travel sensor 216, and/or a difference between a set point value and a current valve travel value or pressure value. In some embodiments, the valve controller 202 generates a drive signal from −1 to 1, where a drive signal of 1 indicates 100% supply flow to the actuator, a drive signal of 0 indicates 0% supply flow to the actuator, and a drive signal of −1 indicates 100% exhaust flow from the actuator. The valve controller 202 may provide the drive signal to the I/P drivers 204, 206.

The I/P drivers 204, 206 may include a first I/P driver 204 for controlling supply flow by generating a supply relay PWM current signal and providing the supply relay PWM current signal to a first I/P transducer 208 for generating a supply pressure signal. The I/P drivers 204, 206 may also include a second I/P driver 206 for controlling exhaust flow by generating an exhaust really PWM current signal and providing the exhaust relay PWM current signal to a second I/P transducer 210 for generating an exhaust pressure signal. In some implementations, the I/P drivers 204, 206 may be software modules within the valve controller 202 having instructions for converting the drive signal into supply and exhaust current signals, respectively. In other implementations, the I/P drivers 204, 206 may each include a processor and a memory having instructions for converting the drive signal into supply and exhaust current signals, respectively, or may be hard-coded into EPROMs, EEPROMs, application specific integrated circuits (ASICs), or any other hardware or firmware elements. The valve controller 202 may be coupled to the I/P drivers 204, 206 via a wired or wireless communication link for communicating the drive signal to the I/P drivers 204, 206. In other implementations, as mentioned above, the I/P drivers 204 may be software modules included in the valve controller 202.

Each I/P driver 204, 206 may generate a PWM current signal having a particular period (e.g., 0.070 seconds) corresponding to the drive signal. More specifically, each I/P driver 204, 206 may generate a rectangular pulse wave having a particular period (e.g., 0.070 seconds), where the rectangular pulse wave includes current values above a threshold maximum current level (e.g., 18 mA) at one or more time intervals within the particular period and/or current values below a threshold minimum current level (e.g., 4 mA) at one or more other time intervals within the particular period. Each I/P driver 204, 206 may generate a respective PWM current signal based on the drive signal from the valve controller 202. When the drive signal is greater than zero, the I/P driver 204 may generate a PWM current signal having a duty cycle that corresponds to the drive signal. For example, if the drive signal is 0.1, the I/P driver 204 may generate a PWM current signal having a duty cycle of 10%. Also when the drive signal is greater than zero, the I/P driver 206 may generate a PWM current signal having a duty cycle of 0%. When the drive signal is less than zero, the I/P driver 206 may generate a PWM current signal having a duty cycle that corresponds to the drive signal. Also when the drive signal is less than zero, the I/P driver 204 may generate a PWM current signal having a duty cycle of 0%. When the drive signal is 0, both I/P drivers 204, 206 may generate a PWM current signal having a duty cycle of 0%.

The I/P transducers 208, 210 may receive the PWM current signal from the respective I/P driver 204, 206, and may generate a PWM pressure signal that is proportional to the PWM current signal. In some implementations, the I/P transducers 208, 210 may be designed as on-off devices, such that at any particular time interval each I/P transducer 208, 210 provides zero pressure (or pressure below a threshold minimum pressure level) or provides full supply pressure (or pressure above a threshold maximum pressure level). For example, when the PWM current signal for the I/P driver 204 has a duty cycle of 10%, the I/P transducer 208 may provide full supply pressure (e.g., 20 psig) for 10% of the particular period and may provide zero supply pressure for the remaining 90% of the period. Accordingly, the average pressure output for the period may be 10% of the full supply pressure (e.g., 2 psig). In some implementations, the I/P driver 204 is coupled to the I/P transducer 208 and the I/P driver 206 is coupled to the I/P transducer 210. In other implementations, such as when the I/P drivers 204, 206 are software modules within the valve controller 202, the valve controller 202 is coupled to the I/P transducers 208, 210.

The supply relay 212 may receive the PWM pressure signal from the I/P transducer 208 and may provide supply flow to the actuator 12 in accordance with the PWM pressure signal. The exhaust relay 214 may receive the PWM pressure signal from the I/P transducer 210 and may obtain exhaust flow from the actuator 12 in accordance with the PWM pressure signal. For example, the supply relay 212 may open at time intervals when the I/P transducer 208 provides pressure and may close at time intervals when the I/P transducers 208 does not provide pressure. The exhaust relay 214 may open at time intervals when the I/P transducer 210 provides pressure and may close at time intervals when the I/P transducers 210 does not provide pressure.

The valve travel sensor 216 may continuously or periodically (e.g., every millisecond, every 0.070 seconds, etc.) obtain current valve travel values indicating the valve travel for the valve and/or may obtain current pressure values indicating the amount of pressure at an actuator in valve. The valve travel may be 0 when the valve is fully closed, 100 when the valve is fully opened, or any suitable number in between 0 and 100 when the valve is partially opened.

Figure 3:
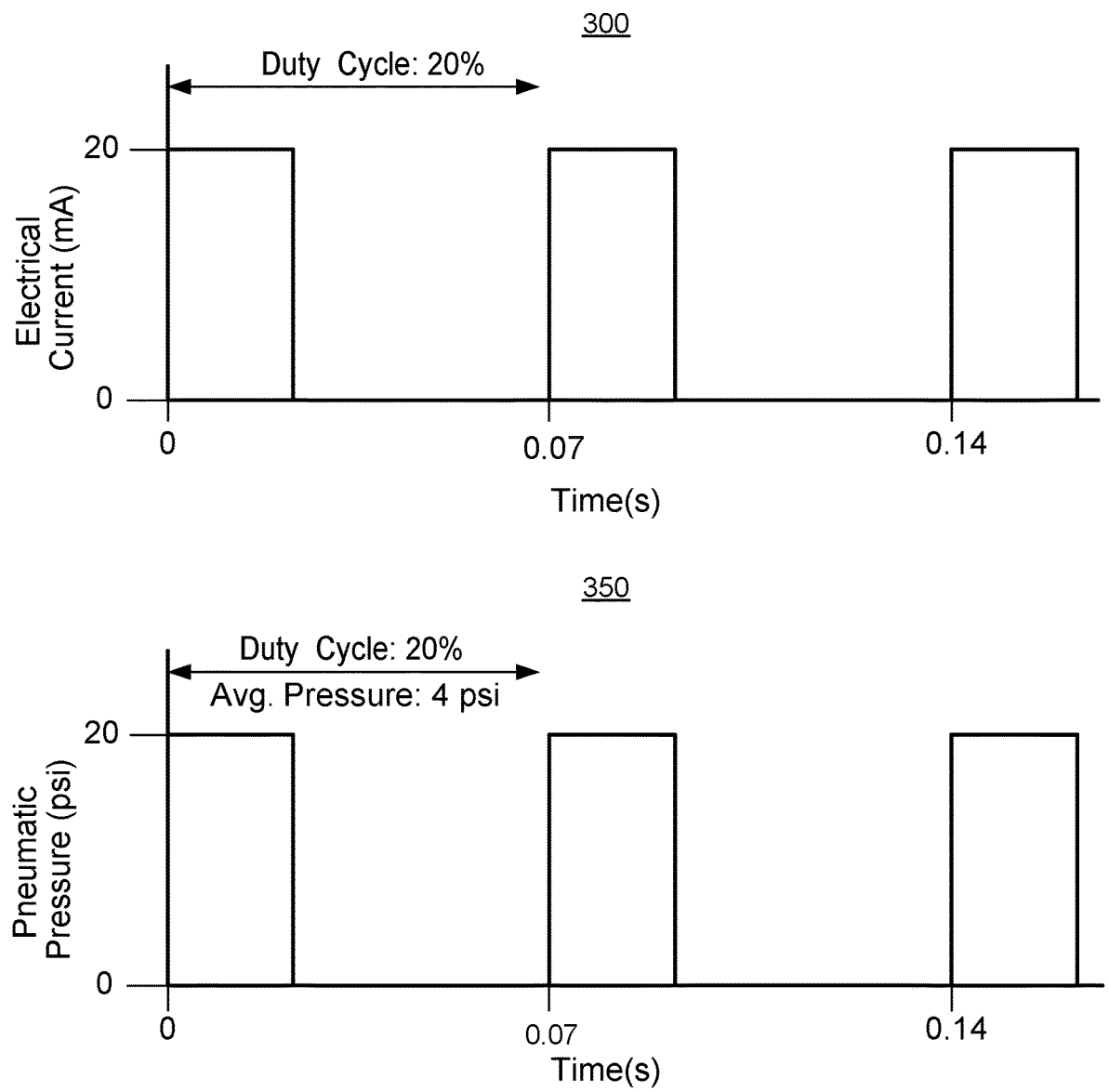
FIG. 3 is an example graph of a pulse-width modulated current signal and a pulse-width modulated pressure signal provided by a valve controller, and an electropneumatic converter, respectively, operating in the digital valve positioner of FIG. 1.

FIG. 3 illustrates an example graph of a PWM current signal 300 and a PWM pressure signal 350 provided by the valve controller 202 and the I/P transducer 208, respectively. As mentioned above, the valve controller 202 may generate a drive signal (e.g., 0.2) and may provide the drive signal to the I/P driver 204 which may generate the PWM current signal 300 based on the drive signal. In some implementations, the I/P driver 204 may be included within the valve controller 202. In any event, the PWM current signal 300 has a period of 0.070 seconds. The I/P driver 204 may generate current values above a threshold maximum current level for a first set of time intervals which occur between the beginning of the period and 0.014 seconds after the beginning of the period, and may generate current values below a threshold minimum current level for a second set of time intervals which occur between 0.014 seconds after the beginning of the period and the end of the period.

The I/P transducer 208 may receive the PWM current signal 300 and may generate a PWM pressure signal 350 in accordance with the PWM current signal. For example, at time intervals where the PWM current signal includes current values above the threshold maximum current level, the I/P transducer 208 may provide full supply pressure (e.g., 20 psig), and at time intervals where the PWM current signal includes current values below the threshold minimum current level, the I/P transducer 208 may provide zero supply pressure. The duty cycle for the PWM pressure signal 350 is 20%, and accordingly the average amount of pressure provided by the I/P transducer 208 over the period is 20% of the full supply pressure of 4 psig.

Figure 4A:
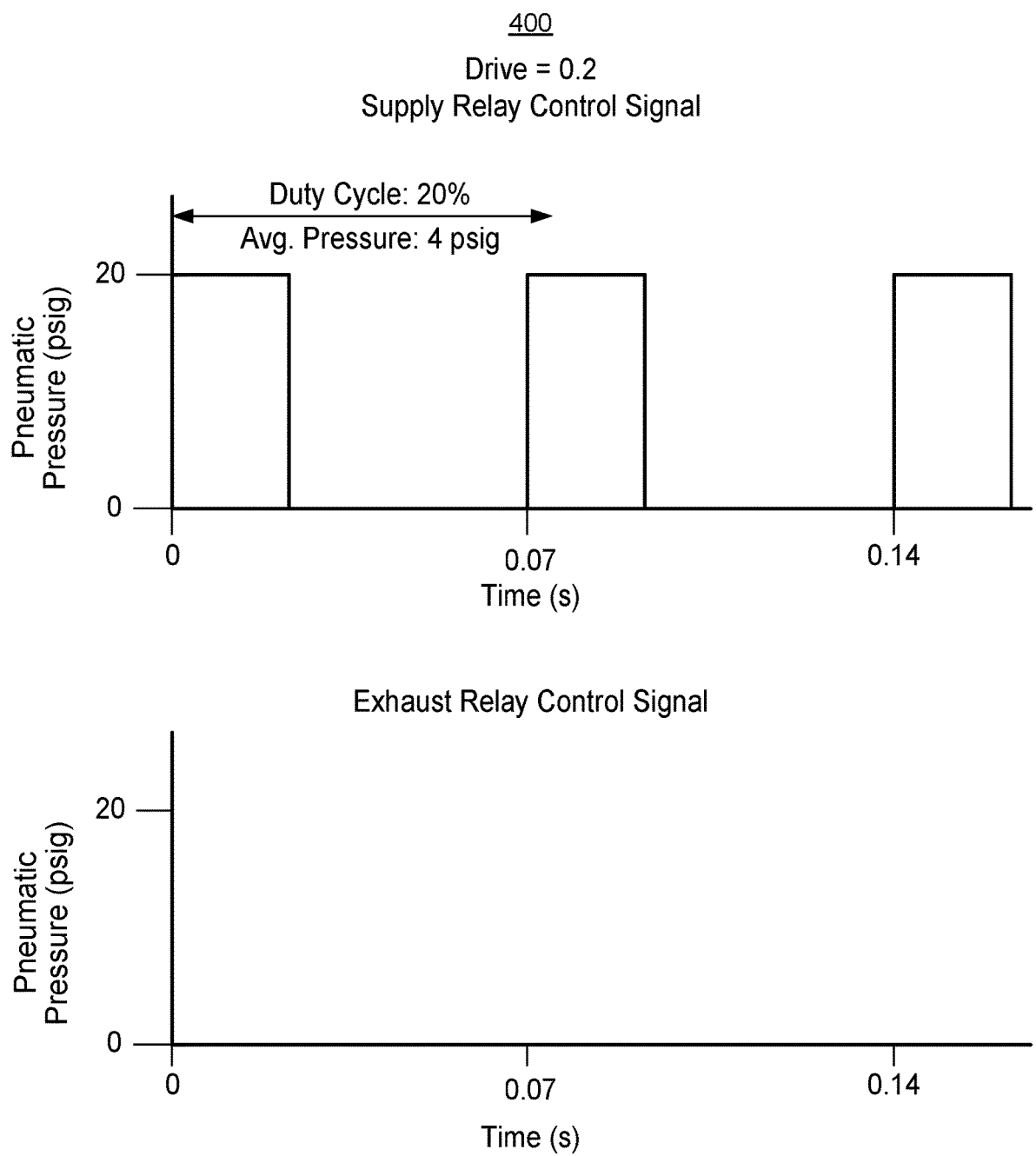
FIG. 4A is an example graph of pulse-width modulated pressure signals provided to a supply relay and an exhaust relay, respectively, in response to a first drive signal provided by a valve controller operating in the digital valve positioner of FIG. 1.
Figure 4B:
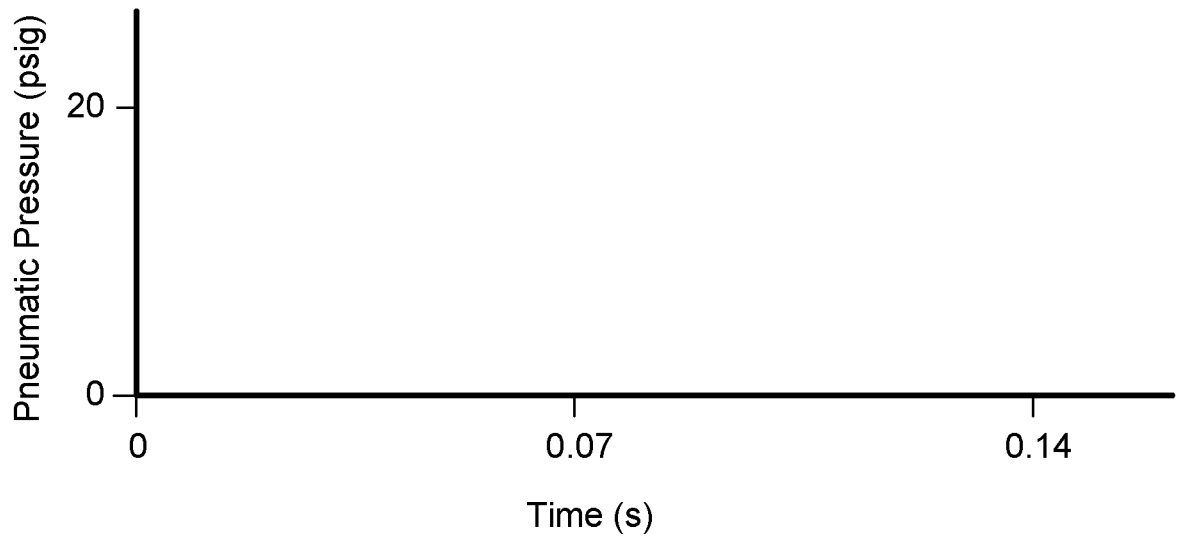
FIG. 4B is another example graph of pulse-width modulated pressure signals provided to a supply relay and an exhaust relay, respectively, in response to a second drive signal provided by a valve controller operating in the digital valve positioner of FIG. 1.
Figure 4B:
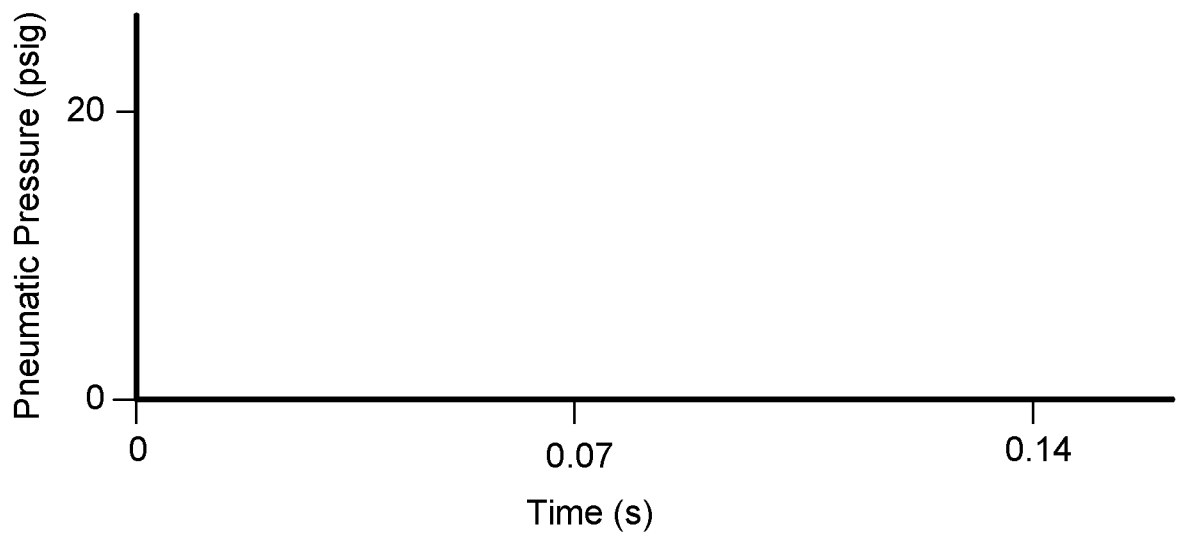
Figure 4C:
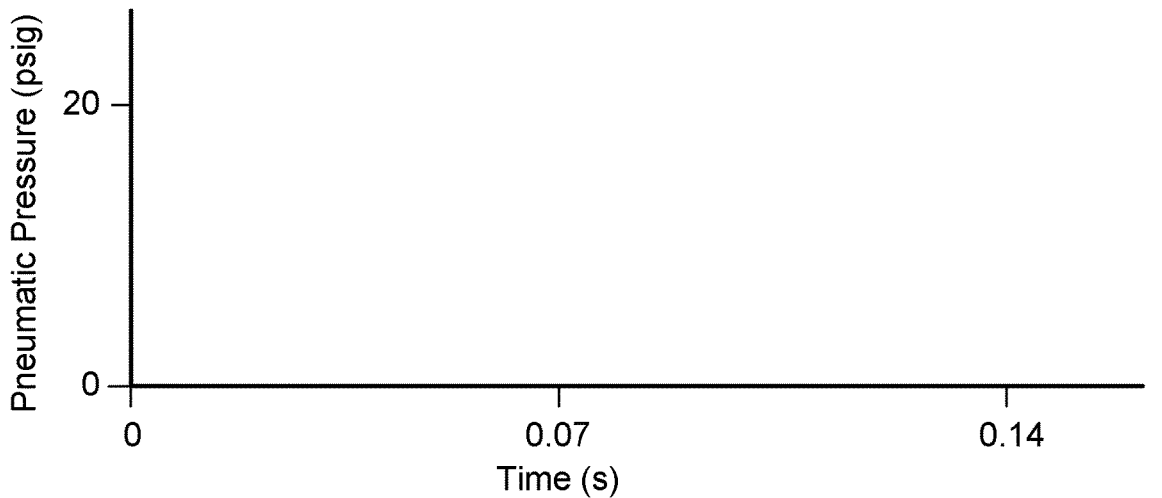
FIG. 4C is yet another example graph of pulse-width modulated pressure signals provided to a supply relay and an exhaust relay, respectively, in response to a third drive signal provided by a valve controller operating in the digital valve positioner of FIG. 1.
Figure 4C:
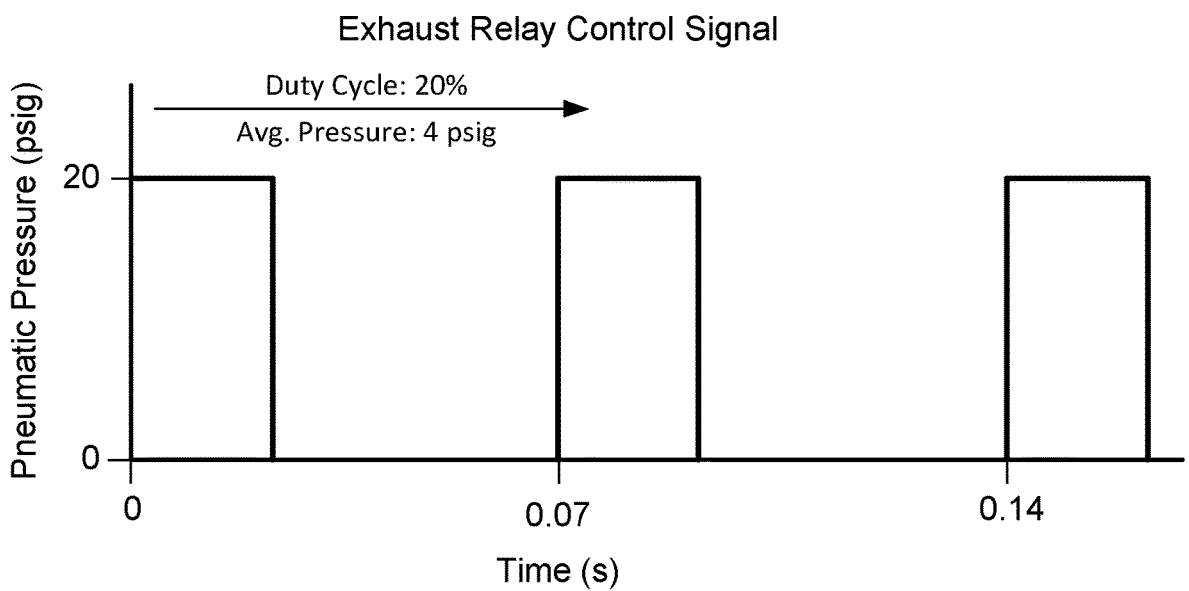

FIGS. 4A-4C illustrate graphs of example PWM pressure signals provided to the supply relay 212 and the exhaust relay 214 when the drive signal from the valve controller 202 is 0.2, 0, and −0.2. In the example graph 400, the drive signal provided from the valve controller 202 is 0.2. As a result, the supply relay 212 opens for 20% of the period and closes for the remaining 80% of the period. The exhaust relay 214 remains closed for the entire period. In the example graph 440, the drive signal provided from the valve controller 202 is 0. As a result, the supply relay 212 and the exhaust relay 214 remain closed for the entire period. In the example graph 480, the drive signal provided from the valve controller 202 is −0.2. As a result, the exhaust relay 214 opens for 20% of the period and closes for the remaining 80% of the period. The supply relay 212 remains closed for the entire period.

To determine the drive signal to provide to the I/P drivers 204, 206, the valve controller 202 may compare a set point value to the current valve travel or current pressure value, as determined by the valve travel sensor 216. If the set point value is greater than the current valve travel or pressure value by more than a threshold dead band value (e.g., 0.1%), the valve controller 202 may provide a positive drive signal between 0 and 1. If the set point value is less than the current valve travel or pressure value by more than the threshold dead band value, the valve controller 202 may provide a negative drive signal between 0 and −1. If the set point value and the current valve differ by less than the threshold dead band value, the valve controller 202 may provide a drive signal of 0.

Figure 5A:
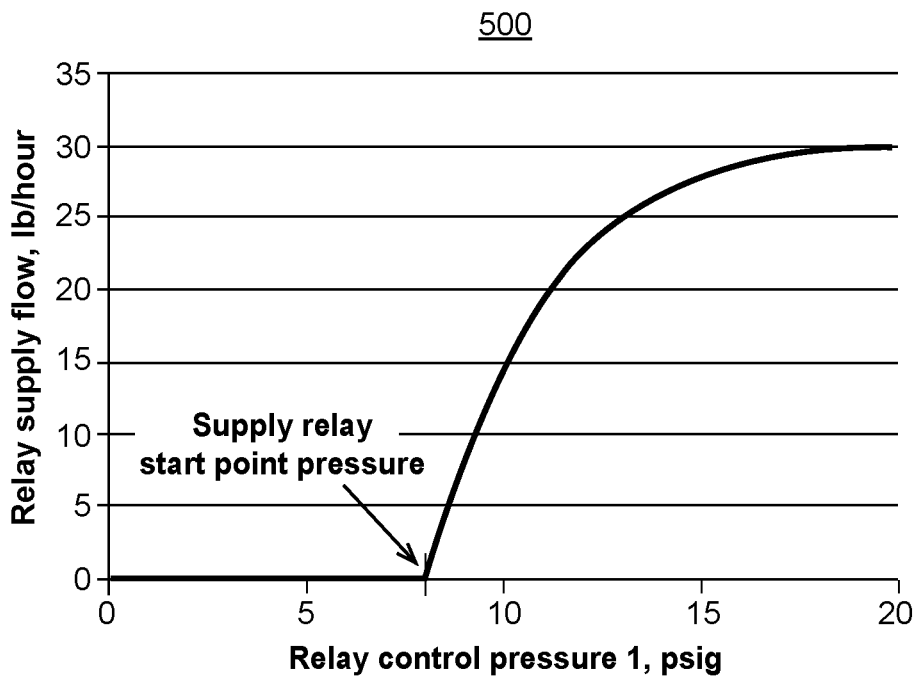
FIG. 5A is an example graph of relay supply flow as a function of relay control pressure from a supply relay operating in the digital valve positioner of FIG. 1.
Figure 5B:
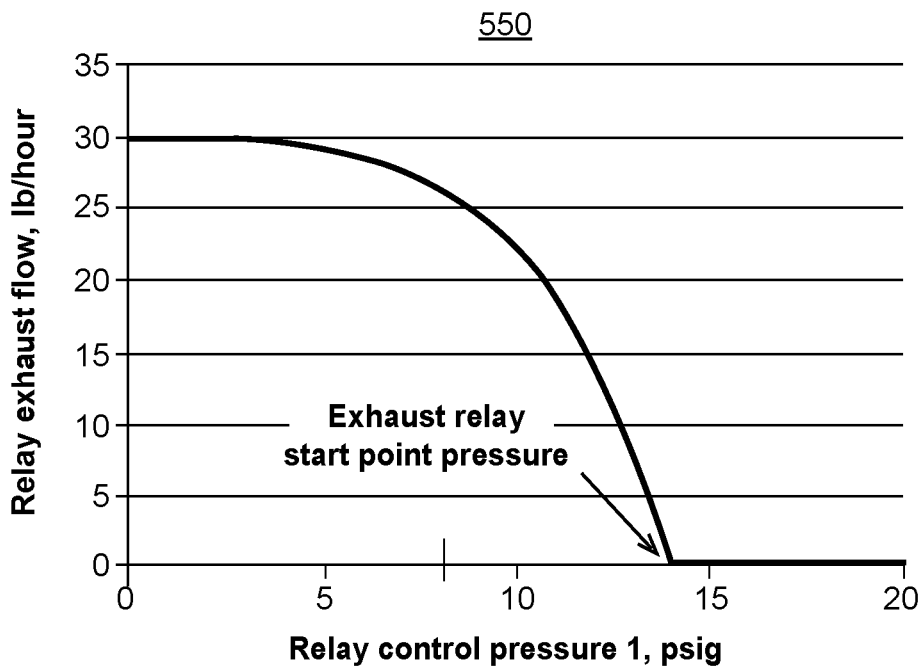
FIG. 5B is an example graph relay exhaust flow as a function of relay control pressure from an exhaust relay operating in the digital valve positioner of FIG. 1.

Additionally, the supply and exhaust relays 212, 214 may need to receive a minimum threshold amount of pressure before opening to provide supply flow or receive exhaust flow from the actuator 12. The valve controller 202 may identify the minimum threshold amount of pressure and provide a drive signal in accordance with the minimum threshold amount of pressure to move the valve travel or pressure value towards the set point (also referred to herein as a "relay start point"). For example, FIGS. 5A and 5B illustrate example graphs 500, 550 of relay supply flow and relay exhaust flow, respectively, as a function of relay control pressure. In the example graph 500, the relay control pressure for the supply relay 212 approaches about 8 psig before relay supply flow is provided to the actuator 12. As a result, to increase the valve travel, the valve controller 202 may provide a drive signal corresponding to at least 8 psig. If the full supply pressure is 20 psig, the drive signal may be 0.4. In the example graph 550, the relay control pressure for the exhaust relay 212 approaches about 14 psig before relay exhaust flow is provided from the actuator 12. As a result, if the full supply pressure is 20 psig, to decrease the valve travel, the valve controller 202 may provide a drive signal corresponding to at least 6 psig or 0.3.

The drive signals, set point values, and sensor data from the valve travel sensor 216 are discussed herein with reference to valve travel, such that the valve travel sensor 216 obtains current valve travel values for the valve, the set point value is a set point valve travel value, and the drive signal is generated based on the difference between the current valve travel values and the set point valve travel value. However, the drive signals, set point values, and sensor data from the valve travel sensor 216 may also be based on pressure values in the valve, such that the valve travel sensor 216 obtains current pressure values for the valve, the set point value is a set point pressure value, and the drive signal is generated based on the difference between the current pressure values and the set point pressure value. Thus, as used herein, the set point value may refer to a set point valve travel value or a set point pressure value. The sensor data from the valve travel sensor 216 may include current valve travel values or current pressure values at the valve, and the drive signal may be based on either the difference between the current valve travel values and the set point valve travel value or the difference between the current pressure values and the set point pressure value. Accordingly, while each of the features of the digital positioner 14 (e.g., relay start point identification, Armageddon damping, dead band adapter, high/low cutout, anti-windup on loss of supply pressure, and wrong way corrector) are described below with reference to valve travel, the features may also be performed using current pressure values at the valve and a set point pressure value.

Large changes in the travel operating point can result in a variation of the relay start point that requires more time for the digital positioner 14 to converge to the proper value. This migration is due to shifting of the respective relay start point as a function of relay output pressure and can vary based on the actuator design or natural operation and variation in relay assemblies. Also, when the valve controller 202 first begins to operate, the respective supply and exhaust start points are not known and significant amounts of time can pass while a relay start point identification process converges to useful values for the supply start point and the exhaust start point. During this initial convergence time, valve travel may be off considerably, and good positioning control may not be possible until suitable values for supply and exhaust start points converge to their respective relay start point values. To improve valve controller 202 response when output pressure based shifts occur, a static bias value is included that compensates for output related shifts using data collected during the calibration of the valve controller 202.

Relay Start Point Identification

To determine a relay start point or the minimum threshold amount of pressure to open the supply and exhaust relays 212, 214, the valve controller 202 may perform calibration techniques. One example calibration technique may include providing multiple predetermined set point values (e.g., 90%, 50%, and 10%) to the digital positioner 14 at different time intervals. At each set point value, a small amount of modulation is added to the set point value to provide drive signals for the supply and exhaust relays 212, 214 at each set point value. For example, when a first set point value is 90%, the valve controller 202 may oscillate the set point value between 90% and 91% to provide drive signals for the supply and exhaust relays 212, 214 around the 90% set point value. The valve controller 202 may then determine the change in drive signals for the supply and exhaust relays 212, 214 across the different set point values which may be used to determine a relay start point for a particular set point value.

Figure 6A:
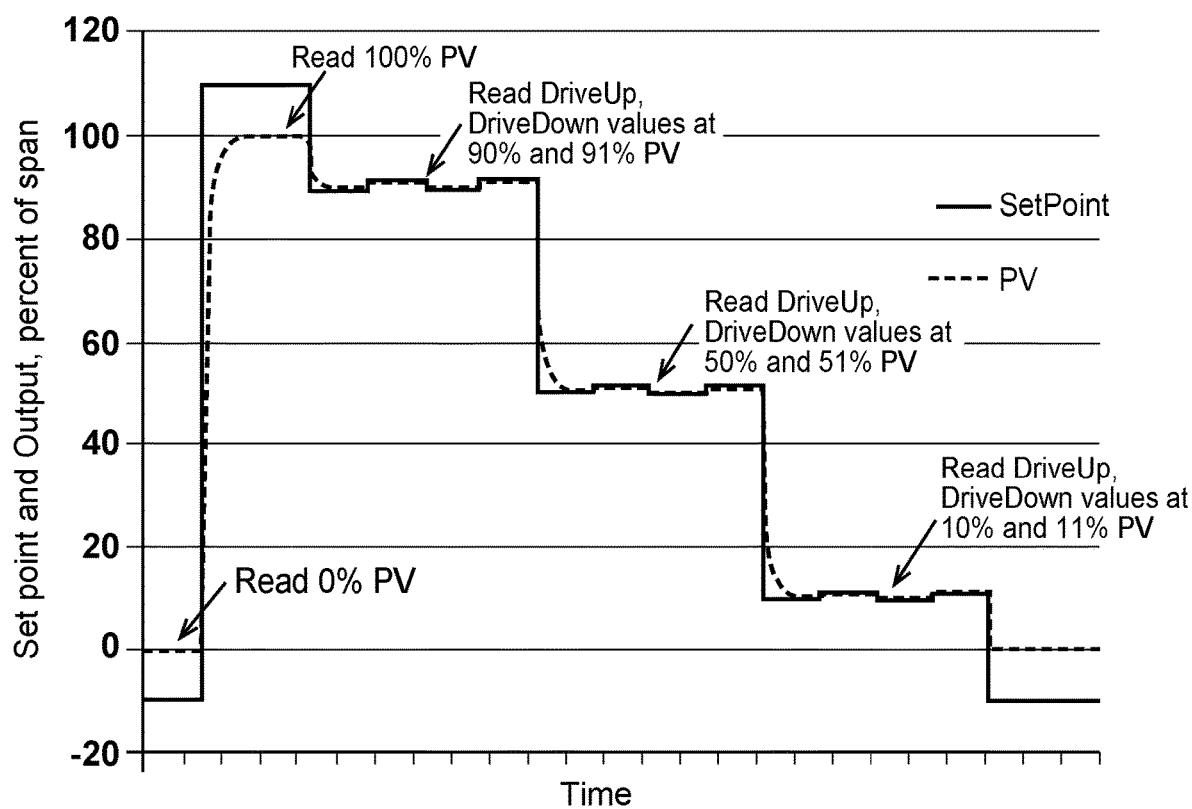
FIG. 6A is an example graph of set point and valve travel values as a function of time for calibrating the digital valve positioner of FIG. 1 to identify starting point values for the supply relay and the exhaust relay.
Figure 6B:
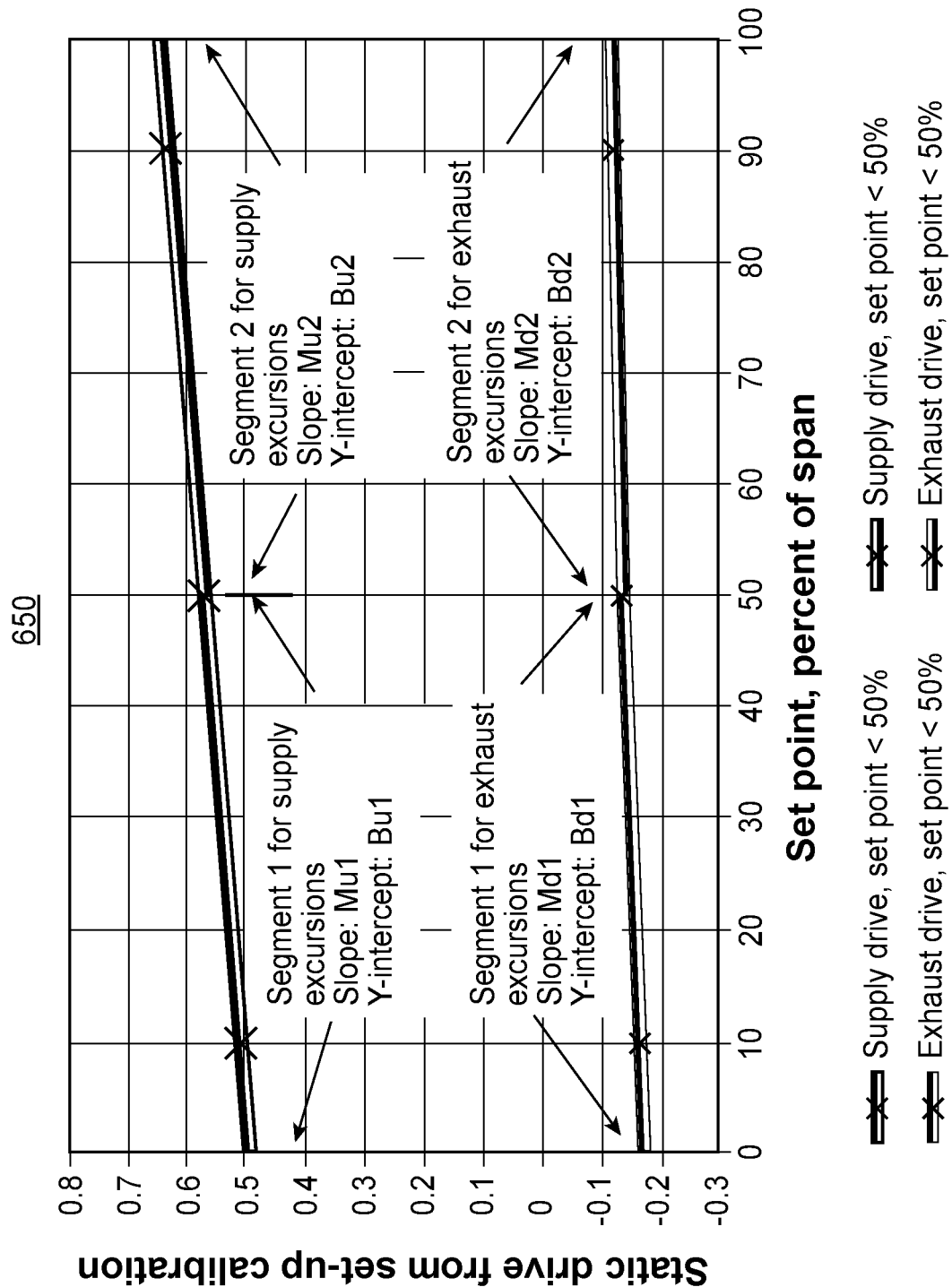
FIG. 6B is an example graph of starting point values as a function of set point for the supply relay and the exhaust relay based on the calibration of FIG. 6A.

FIG. 6A illustrates an example graph 600 of set point and valve travel values as a function of time for calibrating the digital valve positioner 14. In the example graph, the set point changes from above 100% to 90%. Then the set point oscillates between 90% and 91%. The set point then drops to 50% and oscillates between 50% and 51%. Next, the set point drops to 10% and oscillates between 10% and 11%. FIG. 6B illustrates an example graph of the drive signal values for the supply relay 212 and the exhaust relay 214 across the various set point values of FIG. 6A. When the set point oscillated between 10% and 11%, the drive signal to the supply relay 212 to increase the valve travel from 10% to 11% was about 0.5. When the set point oscillated between 10% and 11%, the drive signal to the exhaust relay 214 to decrease the valve travel from 11% to 10% was about −0.18. When the set point oscillated between 50% and 51%, the drive signal to the supply relay 212 to increase the valve travel from 50% to 51% was about 0.58. When the set point oscillated between 50% and 51%, the drive signal to the exhaust relay 214 to decrease the valve travel from 51% to 50% was about −0.13. When the set point oscillated between 90% and 91%, the drive signal to the supply relay 212 to increase the valve travel from 90% to 91% was about 0.62. When the set point oscillated between 90% and 91%, the drive signal to the exhaust relay 214 to decrease the valve travel from 91% to 90% was about −0.11.

The valve controller 202 may generate a model for determining the supply relay drive signals and the exhaust relay drive signals as a function of the set point value. In some implementations, the model may be a linear equation having a slope and intercept. In other implementations, the model may be any other suitable equation or algorithm for determining the supply relay drive signals and the exhaust relay drive signals as a function of the set point value. In any event, the valve controller 202 may determine a line of best fit for the supply relay drive signals and the exhaust relay drive signals. Then the valve controller 202 may store the slope ($M_u$) and offset ($B_u$) of the line of best fit for the supply relay drive signal, and may store the slope ($M_d$) and offset ($B_d$) of the line of best fit for the exhaust relay drive signal. When the valve controller 202 obtains a new set point value, the valve controller 202 may apply the new set point value to the slope and offset for the supply relay drive signal or the exhaust relay drive signal to generate the drive signal.

In some implementations, the valve controller 202 may determine two lines of best fit for the supply relay drive signals and the exhaust relay drive signals, where the first line of best fit is for when the set point for the supply relay drive signal or the exhaust relay drive signal is less than 50% and the second line of best fit is for when the set point for the supply relay drive signal or the exhaust relay drive signal is greater than or equal to 50%. In this implementation, the valve controller 202 may store the slope ($M_{u1}$) and offset ($B_{u1}$) of the line of best fit for the supply relay drive signal when the set point is less than 50%, the slope ($M_{u2}$) and offset ($B_{u2}$) of the line of best fit for the supply relay drive signal when the set point is greater than or equal to 50%, the slope ($M_{d1}$) and offset ($B_{d1}$) of the line of best fit for the exhaust relay drive signal when the set point is less than 50%, and the slope ($M_{d2}$) and offset ($B_{d2}$) of the line of best fit for the exhaust relay drive signal when the set point is greater than or equal to 50%. When the valve controller 202 obtains a new set point value, the valve controller 202 may apply the new set point value to the model, such as the corresponding slope and offset to generate the drive signal.

Accordingly, the valve controller 202 may determine the drive signal by determining whether the set point value is greater than the current valve travel or pressure value by more than a threshold dead band value, less than the current valve travel or pressure value by more than the threshold dead band value, or if the set point value and the current valve differ by less than the threshold dead band value. If the set point value is greater than the current valve travel or pressure value by more than the threshold dead band value, the valve controller 202 may determine the drive signal as the sum of $B_u$ and the product of $M_u$ and the set point value. If the set point value is less than the current valve travel or pressure value by more than the threshold dead band value, the valve controller 202 may determine the drive signal as the sum of $B_d$ and the product of $M_d$ and the set point value.

In addition to or as an alternative to determining the relay start point to open the supply and exhaust relays 212, 214 by performing calibration techniques, the valve controller 202 may determine the relay start point to open the supply and exhaust relays 212, 214 dynamically and/or in real-time or at least near real-time. The valve controller 202 determines the relay start point dynamically by comparing the change in valve travel over the period (e.g., 0.070 seconds) when the valve travel reaches a dead band region to a threshold speed (e.g., 1.43% per second). The threshold speed may include a first threshold speed for the supply relay 212 and a second threshold speed for the exhaust relay 214. In some implementations, the first and second threshold speeds are the same. In other implementations, the first and second threshold speeds are different. Additionally, the threshold speed and/or the first and second threshold speeds may remain constant over several applications, including when the digital positioner 14 controls actuators having different internal volumes. In this manner, a response characteristic of the digital positioner 14 may be the same for actuators of various internal volumes.

If the valve travel is increasing over time, is within the dead band region (e.g., ±0.1% of the set point value), was outside of the dead band region the previous period, and the difference in the valve travel over the period exceeds the threshold speed, the valve controller 202 may determine that the valve is traveling too quickly and may reduce the dynamic relay start point by a first predetermined amount (e.g., 0.005). If the valve travel is increasing over time, is above the dead band region (e.g., greater than 0.1% of the set point value), was below the dead band region the previous period (e.g., less than 0.1% of the set point value), the difference in the valve travel over the period exceeds the threshold speed, and the set point value has not changed by more than the dead band value over the period, the valve controller 202 may determine that the valve completely crossed the dead band region in a single period and may reduce the dynamic relay start point by a second predetermined amount (e.g., 0.02) which is greater than the first predetermined amount. If the valve travel is increasing over time, and the difference in the valve travel over the period is less than 95% of the threshold speed, the valve controller 202 may determine that the valve is traveling too slowly and may increase the dynamic relay start point by a third predetermined amount (e.g., 0.004).

Figure 7A:
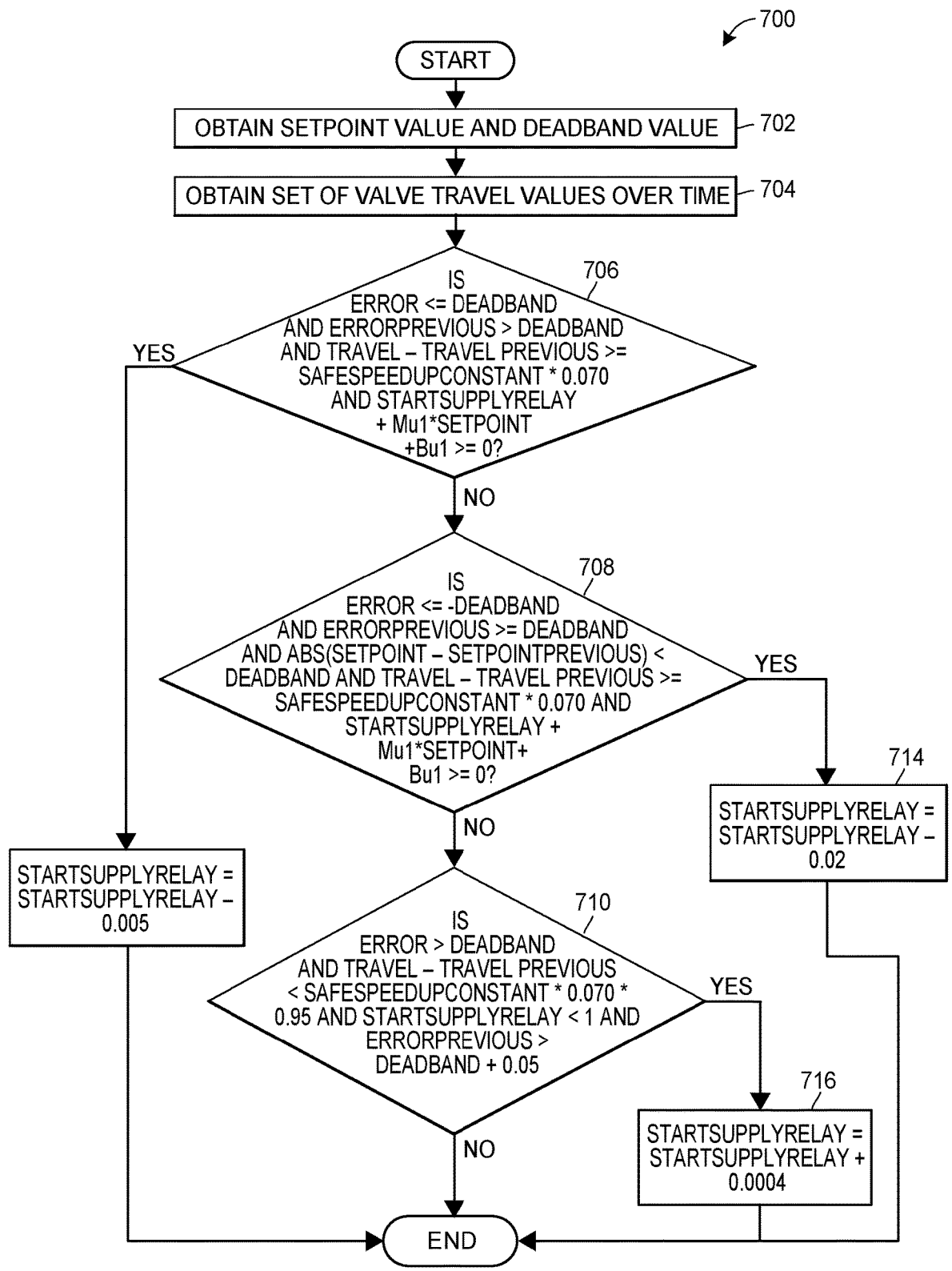
FIG. 7A is a flow diagram of an example method for identifying starting point values for the supply relay, which may be implemented by a valve controller operating in the digital valve positioner of FIG. 1.

FIG. 7A is a flow diagram of an example method 700 for identifying starting point values for the drive signal for the supply relay 212. The method may be implemented by the valve controller 202. At block 702, the valve controller 202 obtains a set point value and a dead band value (e.g., 0.1%). Then at block 704, the valve controller 202 obtains valve travel values for the valve from the valve travel sensor 216. The valve travel sensor 216 may provide a current valve travel value each period (e.g., 0.070 seconds).

At block 706, the valve controller 202 may determine whether the valve is traveling too quickly upon entering the dead band region from valve travel values below the set point value. If the valve travel is increasing over time, is within the dead band region (e.g., ±0.1% of the set point value), was outside of the dead band region the previous period, the difference in the valve travel over the period exceeds the threshold speed (e.g., the first threshold speed), and the sum of the current dynamic relay start point (e.g., startsupplyrelay) and the calibrated relay start point (e.g., $M_u$*set point value+$B_u$) is greater than 0, the valve controller 202 may determine that the valve is traveling too quickly and may reduce the dynamic relay start point by a first predetermined amount (e.g., 0.005) (block 712).

At block 708, the valve controller 202 may determine whether the valve completely crossed the dead band region in a single period from valve travel values below the set point value. If the valve travel is increasing over time, is above the dead band region (e.g., greater than 0.1% of the set point value), was below the dead band region the previous period (e.g., less than 0.1% of the set point value), the difference in the valve travel over the period exceeds the threshold speed, the set point value has not changed by more than the dead band value over the period, and the sum of the current dynamic relay start point (e.g., startsupplyrelay) and the calibrated relay start point (e.g., $M_u$*set point value+$B_u$) is greater than 0, the valve controller 202 may determine that the valve completely crossed the dead band region in a single period and may reduce the dynamic relay start point by a second predetermined amount (e.g., 0.02) which is greater than the first predetermined amount (block 714).

At block 710, the valve controller 202 may determine whether the valve is traveling too slowly from valve travel values below the set point value. If the valve travel is increasing over time, the difference in the valve travel over the period is less than 95% of the threshold speed but greater than 0, and the current dynamic relay start point (e.g., startsupplyrelay) is less than 1, the valve controller 202 may determine that the valve is traveling too slowly and may increase the dynamic relay start point by a third predetermined amount (e.g., 0.004) (block 716).

Figure 7B:
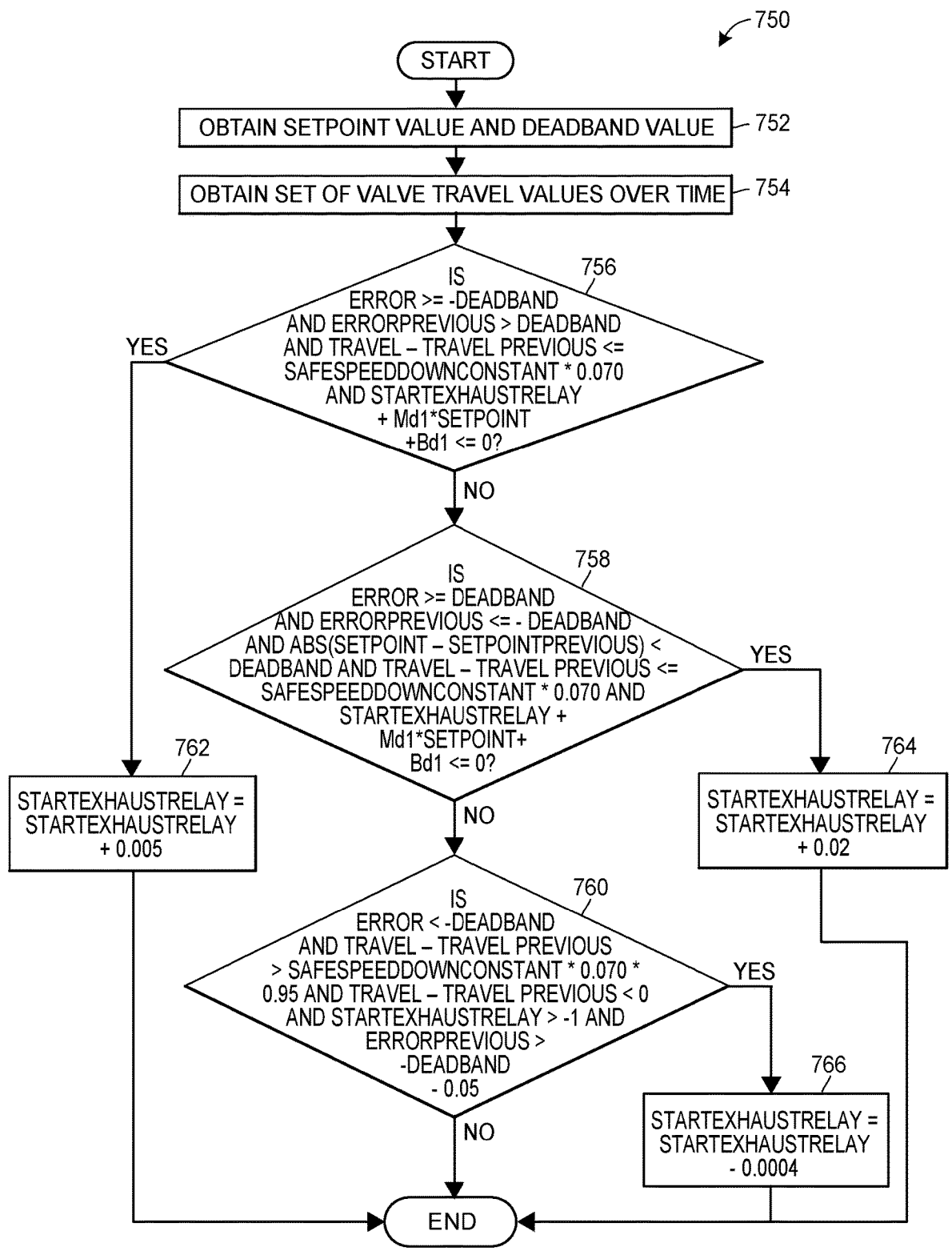
FIG. 7B is a flow diagram of an example method for protecting against damping and for identifying starting point values for the exhaust relay, which may be implemented by a valve controller operating in the digital valve positioner of FIG. 1.

FIG. 7B is a flow diagram of an example method 750 for identifying starting point values for the drive signal for the exhaust relay 214. The method may be implemented by the valve controller 202. At block 752, the valve controller 202 obtains a set point value and a dead band value (e.g., 0.1%). Then at block 754, the valve controller 202 obtains valve travel values for the valve from the valve travel sensor 216. The valve travel sensor 216 may provide a current valve travel value each period (e.g., 0.070 seconds).

At block 756, the valve controller 202 may determine whether the valve is traveling too quickly upon entering the dead band region from valve travel values above the set point value. If the valve travel is decreasing over time, is within the dead band region (e.g., ±0.1% of the set point value), was outside of the dead band region the previous period, the difference in the valve travel over the period is less than the threshold speed (e.g., the second threshold speed) (i.e., more negative than the threshold speed), and the sum of the current dynamic relay start point (e.g., startexhaustrelay) and the calibrated relay start point (e.g., $M_d$*set point value+$B_d$) is less than 0, the valve controller 202 may determine that the valve is traveling too quickly and may increase the dynamic relay start point by a first predetermined amount (e.g., 0.005) (block 762).

At block 758, the valve controller 202 may determine whether the valve completely crossed the dead band region in a single period from valve travel values above the set point value. If the valve travel is decreasing over time, is below the dead band region (e.g., less than 0.1% of the set point value), was above the dead band region the previous period (e.g., greater than 0.1% of the set point value), the difference in the valve travel over the period is less than the threshold speed (i.e., more negative than the threshold speed), the set point value has not changed by more than the dead band value over the period, and the sum of the current dynamic relay start point (e.g., startexhaustrelay) and the calibrated relay start point (e.g., $M_d$*set point value+$B_d$) is less than 0, the valve controller 202 may determine that the valve completely crossed the dead band region in a single period and may increase the dynamic relay start point by a second predetermined amount (e.g., 0.02) which is greater than the first predetermined amount (block 764).

At block 760, the valve controller 202 may determine whether the valve is traveling too slowly from valve travel values above the set point value. If the valve travel is decreasing over time, the difference in the valve travel over the period is greater than 95% of the threshold speed (i.e., less negative than 95% of the threshold speed) but less than 0, and the current dynamic relay start point (e.g., startexhaustrelay) is greater than −1, the valve controller 202 may determine that the valve is traveling too slowly and may increase the dynamic relay start point by a third predetermined amount (e.g., 0.004) (block 766).

In some implementations, the valve controller 202 may determine the relay start point to open the supply and exhaust relays 212, 214 based on a combination of the relay start point determined using calibration techniques and the relay start point determined dynamically. For example, the valve controller 202 may determine the relay start point for a particular set point value as the sum of the relay start point determined using calibration techniques (e.g., $M_u$*set point value+$B_u$ or $M_d$*set point value+$B_d$) and the relay start point determined dynamically (e.g., startsupplyrelay or startexhaustrelay).

Armageddon Damping

In some implementations, to protect the digital positioner 14 from valve travel changes that exceed the digital positioner's ability to adequately respond to or stop unacceptably high values of the rate of change of the valve travel, the valve controller 202 may detect rapid valve travel changes and reset the drive signal. More specifically, the valve controller 202 may determine the change in valve travel over a period and if the change in valve travel over the period exceeds a threshold amount (e.g., ±70% per period or ±1000%/second), the valve controller 202 may reset the drive signal to zero and may reset the dynamic relay supply start point and the dynamic relay exhaust start point to zero.

Figure 8:
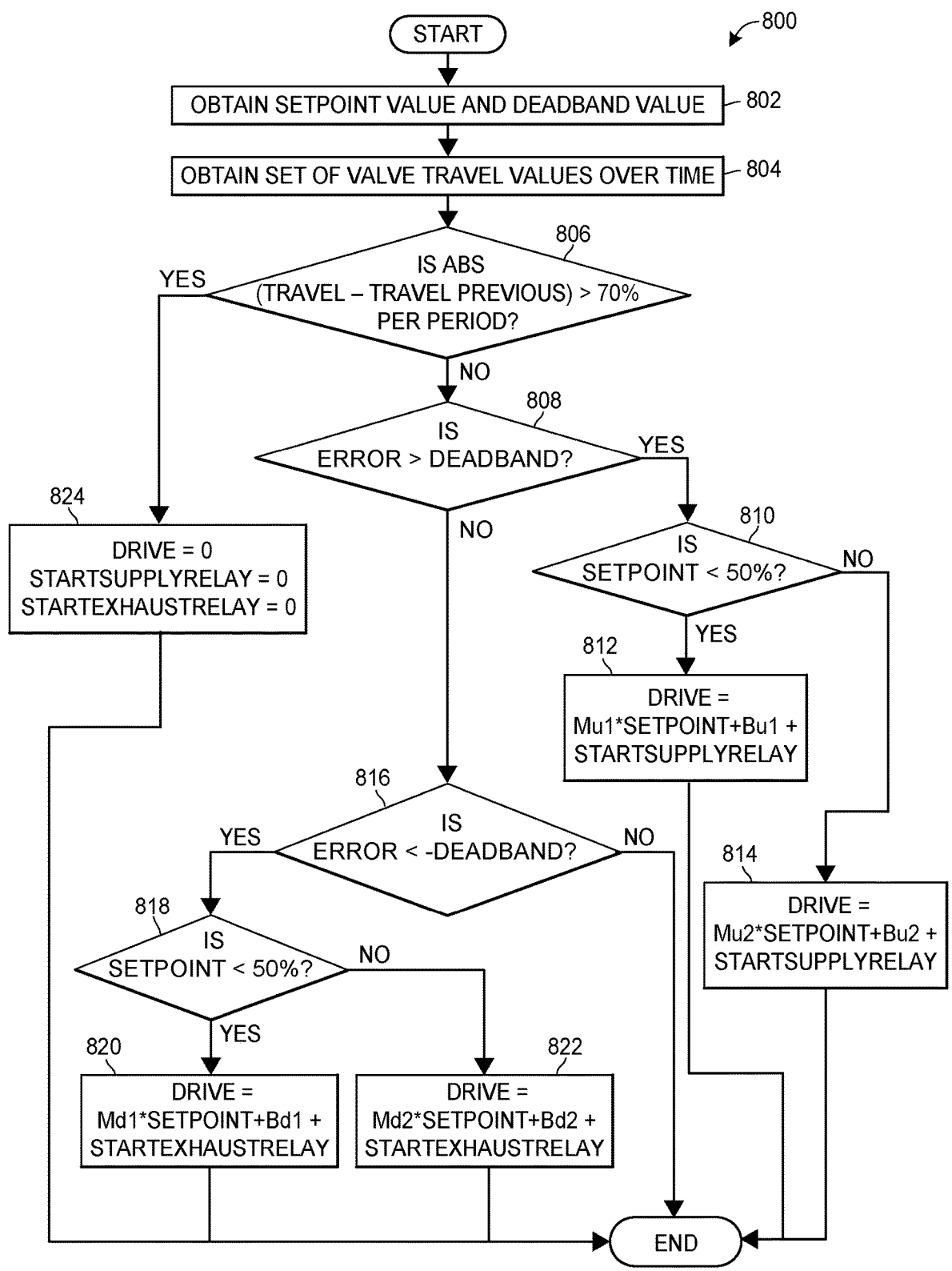
FIG. 8 is a flow diagram of an example method for identifying starting point values for the supply relay and the exhaust relay, which may be implemented by a valve controller operating in the digital valve positioner of FIG. 1.

FIG. 8 is a flow diagram of an example method 800 for identifying starting point values for the supply relay 212 and the exhaust relay 214. The method 800 may be implemented by the valve controller 202. At block 802, the valve controller 202 obtains a set point value and a dead band value (e.g., 0.1%). Then at block 804, the valve controller 202 obtains valve travel values for the valve from the valve travel sensor 216. The valve travel sensor 216 may provide a current valve travel value each period (e.g., 0.070 seconds).

At block 806, the valve controller 202 compares the current valve travel to the valve travel from the previous period. If the change in valve travel over the period exceeds a threshold amount (e.g., ±70% per period or ±1000%/second), the valve controller 202 may reset the drive signal to zero and may reset the dynamic relay supply start point and the dynamic relay exhaust start point to zero (block 824). Otherwise, the valve controller 202 may determine whether the error which is the difference between the set point value and the current valve travel is greater than the dead band value (block 808).

If the valve controller 202 determines that the error is greater than the dead band value, then the current valve travel is outside of the dead band region and is approaching the dead band region from below the set point value. If the set point value is less than 50% (block 810), the valve controller 202 may determine the drive signal as the sum of the relay start point determined using calibration techniques for set point values less than 50% (e.g., $M_{u1}$*set point value+$B_{u1}$) and the relay start point determined dynamically (e.g., startsupplyrelay) (block 812). If the set point value is greater than or equal to 50% (block 810), the valve controller 202 may determine the drive signal as the sum of the relay start point determined using calibration techniques for set point values greater than or equal to 50% (e.g., $M_{u2}$*set point value+$B_{u2}$) and the relay start point determined dynamically (e.g., startsupplyrelay) (block 814). The drive signal may also include proportional to error and controlled variable rate of change feedback control (e.g., proportional derivative (PD) control). The PD control may be the difference between the product of a first gain constant (e.g., 0.02), the difference between the error and the dead band value, a second gain constant (e.g., 4), and the period (e.g., 0.070 seconds), and the difference between the current valve travel value and the valve travel value from the previous period. In other words the equation for the PD control may be:

$$\text{PGainUp}*(\text{MIdeal}*(\text{Error}-\text{Dead Band})*\text{Period}-(\text{Current Valve Travel}-\text{Previous Valve Travel})),$$

where

PGainUp is the first gain constant; and
MIdeal is the second gain constant.

In some implementations, the drive signal may be the sum of the calibrated relay start point, the dynamic relay start point, and the PD control value.

The valve controller 202 may also determine whether the error which is the difference between the set point value and the current valve travel is less than (i.e., more negative than) the negative dead band value (block 816). If the valve controller 202 determines that the error is less than the negative dead band value, then the current valve travel is outside of the dead band region and is approaching the dead band region from above the set point value. If the set point value is less than 50% (block 818), the valve controller 202 may determine the drive signal as the sum of the relay start point determined using calibration techniques for set point values less than 50% (e.g., $M_{d1}$*set point value+$B_{d1}$) and the relay start point determined dynamically (e.g., startexhaustrelay) (block 820). If the set point value is greater than or equal to 50% (block 818), the valve controller 202 may determine the drive signal as the sum of the relay start point determined using calibration techniques for set point values greater than or equal to 50% (e.g., $M_{d2}$*set point value+$B_{d2}$) and the relay start point determined dynamically (e.g., startexhaustrelay) (block 822). The drive signal may also include proportional to error and controlled variable rate of change feedback control (e.g., proportional derivative (PD) control). The PD control may be the difference between the product of a first gain constant (e.g., 0.02), the difference between the error and the dead band value, a second gain constant (e.g., 4), and the period (e.g., 0.070 seconds), and the difference between the current valve travel value and the valve travel value from the previous period. In other words the equation for the PD control may be:

$$\text{PGainUp}*(\text{MIdeal}*(\text{Error}-\text{Dead Band})*\text{Period}-(\text{Current Valve Travel}-\text{Previous Valve Travel})),$$

where

PGainUp is the first gain constant; and
MIdeal is the second gain constant.

In some implementations, the drive signal may be the sum of the calibrated relay start point, the dynamic relay start point, and the PD control value.

Dead Band Adapter

When the valve travel is within a threshold dead band region of the set point value (e.g., if dead band is 0.1%, the dead band region may be ±0.1% of the set point value), the valve controller 202 may set the drive signal to 0, thereby closing both the supply and exhaust relays 212, 214 causing the actuator 12 to remain in the same position. During this state, leakage of air flow is minimized and mechanical wear on the I/P transducers 208, 210 and the supply and exhaust relays 212, 214 is reduced since the I/P transducers 208, 210 do not receive current input signals and the supply and exhaust relays 212, 214 do not receive pressure input signals. The digital positioner 14 remains in this state until the error which is the difference between the set point value and the valve travel is outside of the dead band region.

In some scenarios, it may be desirable to automatically adjust the dead band value over time. For example, the valve controller 202 may detect an overshoot condition where either the valve travel is increasing over time and reaches a valve travel value that is greater than the sum of the set point value and the dead band value or the valve travel is decreasing over time and reaches a valve travel value that is less than the difference between the set point value and the dead band value. In response to detecting the overshoot condition, the valve controller 202 may increment a crossing counter indicating the number of times that the overshoot condition has occurred. If the overshoot condition occurs more than a threshold number of times (e.g., 2), the valve controller 202 may increase the dead band value by a predetermined amount (e.g., 0.1%) and reset the crossing counter to zero. In this manner, the likelihood of an overshoot condition is reduced by increasing the dead band value.

The valve controller 202 may also detect an undershoot condition where either the valve travel is increasing over time and does not exceed a valve travel value that is greater than the difference between the set point value and half of the dead band value or the valve travel is decreasing over time and does not reach a valve travel value that is less than the sum of the set point value and half of the dead band value. In response to detecting the undershoot condition, the valve controller 202 may increment a landing close counter indicating the number of times that the undershoot condition has occurred. If the undershoot condition occurs more than a threshold number of times (e.g., 5), the valve controller 202 may decrease the dead band value by a predetermined amount (e.g., 0.1%) and reset the landing close counter to zero. In this manner, an overdamped condition where the valve travel cannot reach the set point value may be removed by decreasing the dead band value.

Figure 9A:
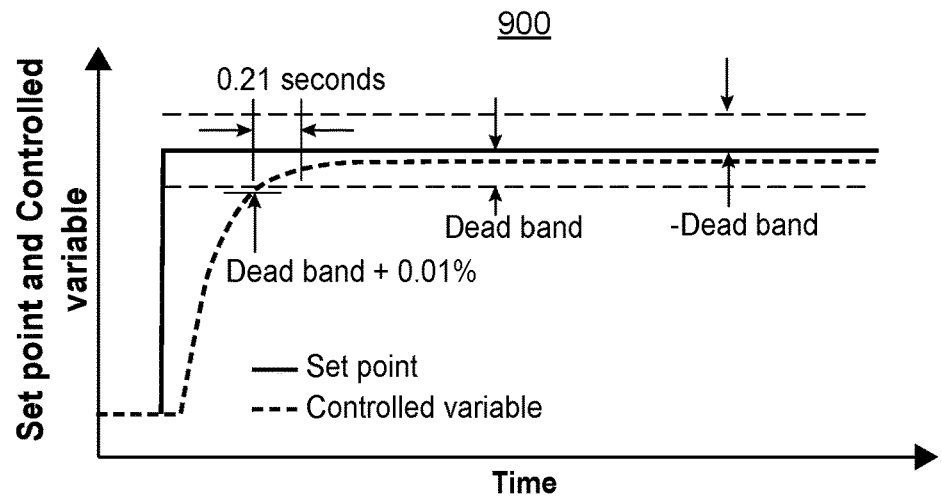
FIG. 9A is an example graph of valve travel values as a function of time compared to a set point value where the digital valve positioner does not overshoot or undershoot the set point value by a value exceeding a dead band value.

FIG. 9A illustrates an example graph 900 of valve travel values as a function of time compared to a set point value where the digital valve positioner 14 does not overshoot or undershoot the set point value by a value exceeding the dead band value. The valve controller 202 may detect an undershoot or overshoot condition by determining that the valve travel at a first point in time $t_1$ is within the dead band region or within a threshold amount of the dead band region (e.g., within 0.01% of the dead band region), and comparing the valve travel at a second point in time $t_2$ to the set point value and the dead band value, where the second point in time $t_2$ occurs a threshold amount of time after the first point in time $t_1$. In some implementations, the threshold amount of time may be proportional to the period (e.g., 0.070 seconds) for the current and pressure signals, such as three times the length of the period (e.g., 0.21 seconds). In the example shown in FIG. 9A, the valve travel at the second point in time $t_2$, 0.21 seconds after the first point in time $t_1$, is very close to the set point value and does not indicate an overshoot or an undershoot condition, because the valve travel at $t_2$ is greater than the difference between the set point value and half of the dead band value and is less than the sum of the set point value and the dead band value.

Figure 9B:
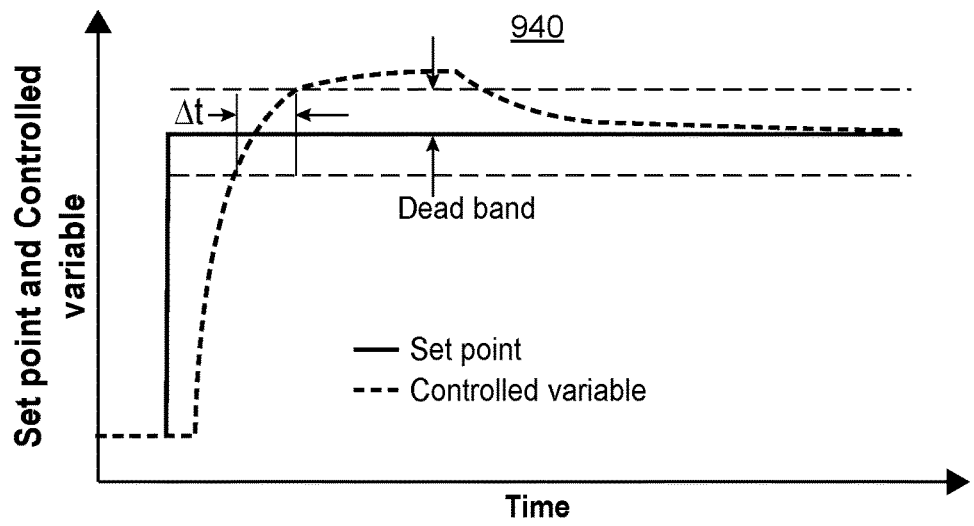
FIG. 9B is an example graph of valve travel values as a function of time compared to a set point value where the digital valve positioner overshoots the set point value by a value exceeding the dead band value.

FIG. 9B illustrates an example graph 940 of valve travel values as a function of time compared to a set point value where the digital valve positioner 14 overshoots the set point value by a value exceeding the dead band value. In this example, the valve travel at the second point in time $t_2$, 0.21 seconds after the first point in time $t_1$, is greater than the sum of the set point value and the dead band value. Accordingly, the valve controller 202 may increment a crossing counter indicating the number of times that the overshoot condition has occurred. If the overshoot condition occurs more than a threshold number of times, the valve controller 202 may increase the dead band value and reset the crossing counter.

Figure 9C:
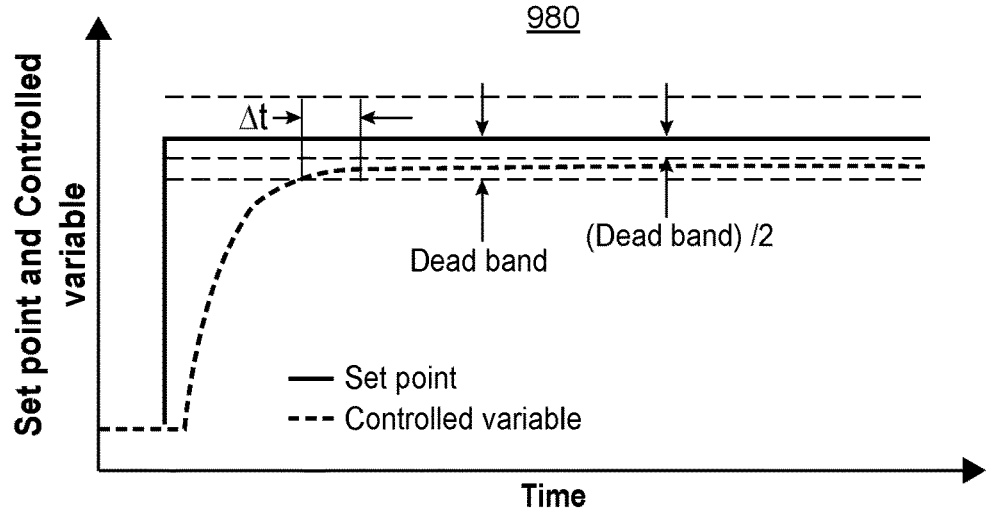
FIG. 9C is an example graph of valve travel values as a function of time compared to a set point value where the digital valve positioner undershoots the set point value by a value exceeding half of the dead band value.

FIG. 9C illustrates an example graph 980 of valve travel values as a function of time compared to a set point value where the digital valve positioner 14 undershoots the set point value by a value exceeding half of the dead band value. In this example, the valve travel at the second point in time $t_2$, 0.21 seconds after the first point in time $t_1$, is less than the difference between the set point value and half of the dead band value. Accordingly, the valve controller 202 may increment a landing close counter indicating the number of times that the undershoot condition has occurred. If the undershoot condition occurs more than a threshold number of times, the valve controller 202 may decrease the dead band value and reset the landing close counter.

Figure 10A:
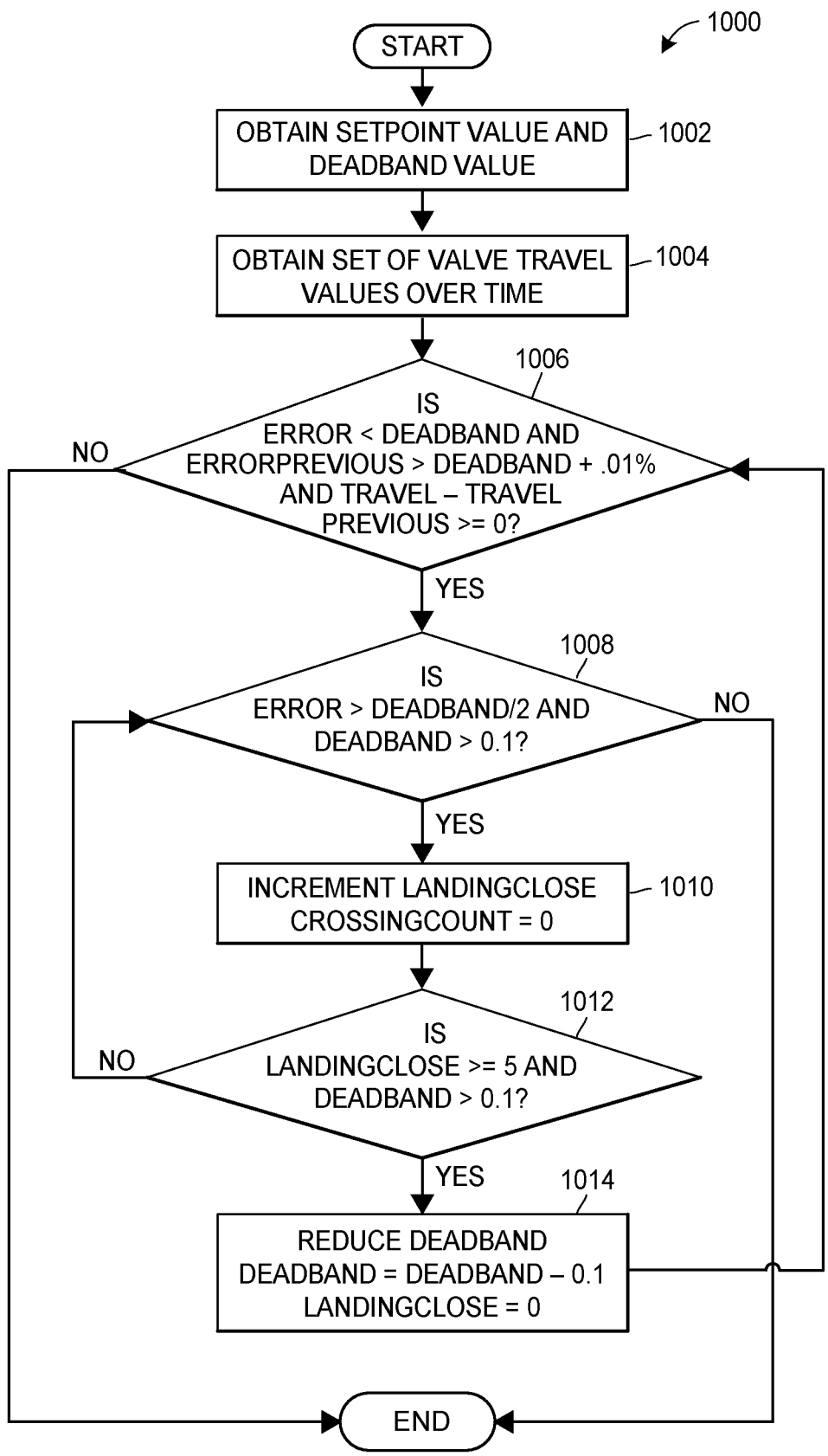
FIG. 10A is a flow diagram of an example method for adjusting the dead band value over time to reduce the dead band value when the digital valve positioner undershoots the set point value by a value exceeding half of the dead band value, which may be implemented by a valve controller operating in the digital valve positioner of FIG. 1.

FIG. 10A is a flow diagram of an example method 1000 for adjusting the dead band value over time to reduce the dead band value when the digital valve positioner 14 undershoots the set point value by a value exceeding half of the dead band value. The method 1000 may be implemented by the valve controller 202. At block 1002, the valve controller 202 obtains a set point value and a dead band value (e.g., 0.1%). Then at block 1004, the valve controller 202 obtains valve travel values for the valve from the valve travel sensor 216. The valve travel sensor 216 may provide a current valve travel value each period (e.g., 0.070 seconds).

At block 1006, the valve controller 202 may determine whether the valve travel is increasing over time and has reached the dead band region after being below the dead band region during the previous period. If the valve travel is increasing over time and has reached the dead band region after being below the dead band region during the previous period, the valve controller 202 may determine whether an undershoot condition is occurring (block 1008). More specifically, upon determining that the valve travel is within a threshold amount of the dead band region (e.g., within 0.01% of the dead band region) at a first point in time $t_1$, the valve controller 202 compares the valve travel at a second point in time $t_2$ to the set point value and the dead band value, where the second point in time $t_2$ occurs a threshold amount of time after the first point in time $t_1$. In some implementations, the threshold amount of time may be proportional to the period (e.g., 0.070 seconds) for the current and pressure signals, such as three times the length of the period (e.g., 0.21 seconds).

If the valve travel at the second point in time $t_2$ is less than the difference between the set point value and half of the dead band value, and the dead band value exceeds a minimum threshold dead band value (e.g., 0.1%), the valve controller 202 increments a landing close counter and resets a crossing counter to zero (block 1010). Then the valve controller 202 determines whether the landing close counter is greater than or equal to a threshold number (e.g., 5) and whether the dead band value is above a minimum threshold dead band value (e.g., 0.1%) (block 1012). If the landing close counter is greater than or equal to the threshold number and the dead band value is above the threshold value, the valve controller 202 may decrease the dead band value by a predetermined amount (e.g., 0.1%) and reset the landing close counter to zero (block 1014). The valve controller 202 may not decrease the dead band value below the minimum threshold dead band value.

If the landing close counter is not greater than or equal to the threshold number, the valve controller 202 may obtain the valve travel at a subsequent point in time which occurs the threshold amount of time after the previous point in time. Then the valve controller 202 compares the valve travel at the subsequent point in time to the difference between the set point value and half of the dead band value to determine whether to increment the landing close counter again.

Figure 10B:
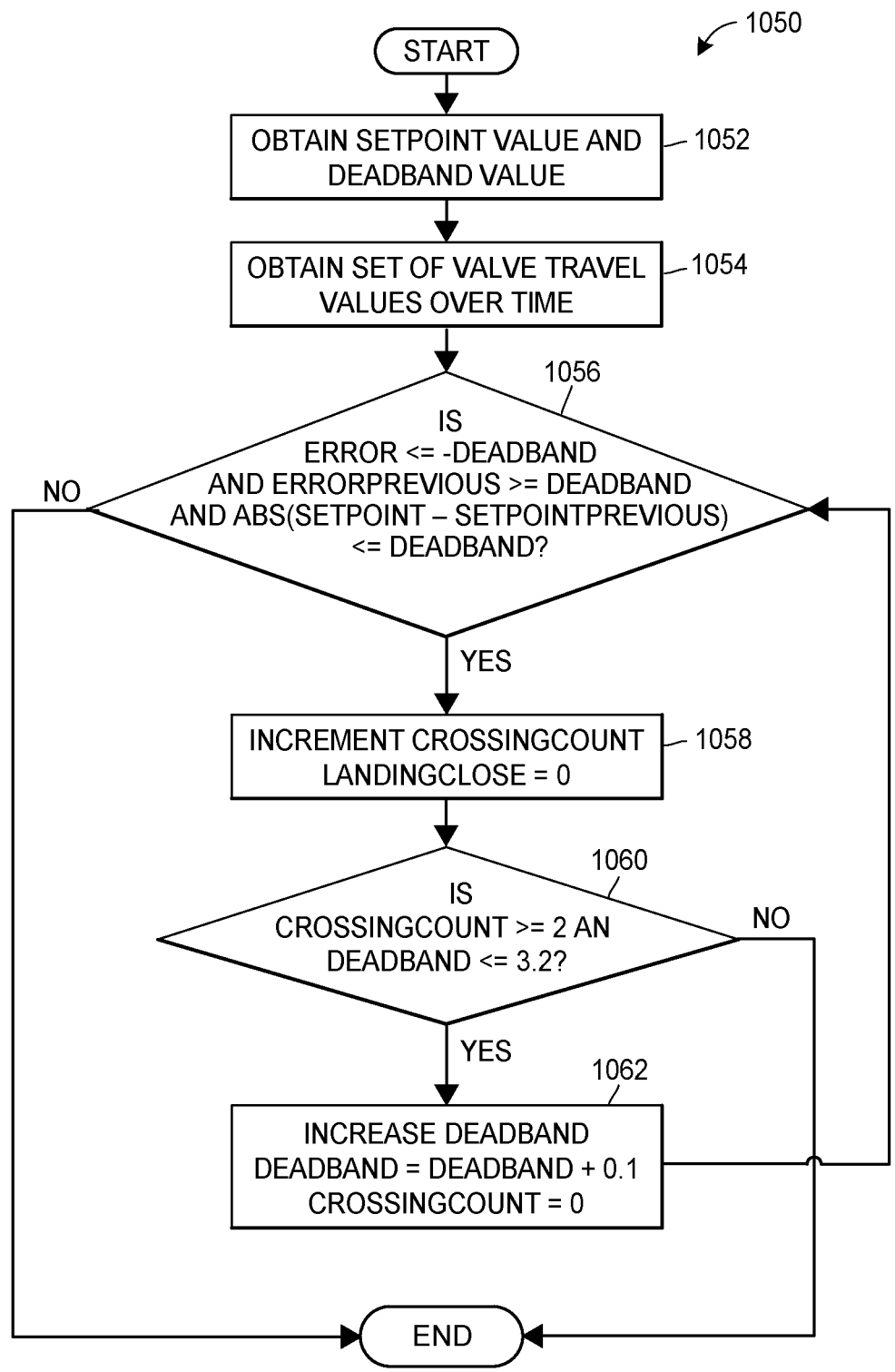
FIG. 10B is a flow diagram of an example method for adjusting the dead band value over time to increase the dead band value when the digital valve positioner overshoots the set point value by a value exceeding the dead band value, which may be implemented by a valve controller operating in the digital valve positioner of FIG. 1.

FIG. 10B is a flow diagram of an example method 1050 for adjusting the dead band value over time to increase the dead band value when the digital valve positioner 14 overshoots the set point value by a value exceeding the dead band value. The method 1050 may be implemented by the valve controller 202. At block 1052, the valve controller 202 obtains a set point value and a dead band value (e.g., 0.1%). Then at block 1054, the valve controller 202 obtains valve travel values for the valve from the valve travel sensor 216. The valve travel sensor 216 may provide a current valve travel value each period (e.g., 0.070 seconds).

At block 1056, the valve controller 202 may determine whether the valve travel is increasing over time and reaches a valve travel value that is greater than the sum of the set point value and the dead band value at a second point in time $t_2$ which is a threshold amount of time (e.g., three periods or 0.21 seconds) after a first point in time $t_1$ in which the valve travel crossed into the dead band region. If the valve travel at the second point in time $t_2$ is greater than the sum of the set point value and the dead band value, and the set point value has not changed by more than the dead band value during the threshold amount of time, the valve controller 202 increments a crossing counter and resets a landing close counter to zero (block 1058). Then the valve controller 202 determines whether the crossing counter is greater than or equal to a threshold number (e.g., 2) and whether the dead band value is below a maximum threshold dead band value (e.g., 3.2%) (block 1060). If the crossing counter is greater than or equal to the threshold number and the dead band value is below the maximum threshold dead band value, the valve controller 202 may increase the dead band value by a predetermined amount (e.g., 0.1%) and reset the crossing counter to zero (block 1062). The valve controller 202 may not increase the dead band value above the maximum threshold dead band value.

If the crossing counter is not greater than or equal to the threshold number, the valve controller 202 may obtain the valve travel at a subsequent point in time which occurs the threshold amount of time after the previous point in time. Then the valve controller 202 compares the valve travel at the subsequent point in time to the sum of the set point value and the dead band value to determine whether to increment the crossing counter again.

High/Low Cutout

When the set point value reaches or exceeds 100% corresponding to a fully opened valve or when the set point value is less than or equal to 0% corresponding to a fully closed valve, the valve controller 202 may saturate the drive signal and provide a drive signal of 1 or −1. In this manner, the valve controller 202 does not need to generate a pulsed current signal with a duty cycle of less than 100% and greater than 0%, because the valve controller 202 does not need to prevent overshooting or undershooting in this scenario. Instead, one of the I/P drivers 204, 206 provides maximum current to the corresponding I/P transducer 208, 210, and the corresponding I/P transducer 208, 210 provides maximum pressure to the supply relay 212 or the exhaust relay 214. This prevents the digital positioner 14 from continuing pulsing operation when the valve travel reaches physical limits of 0% and 100%, which serves no useful purpose and can cause physical wear and tear on the digital positioner 14 components.

The valve controller 202 may also set a saturation flag when the set point value reaches or exceeds 100% or is less than or equal to 0%. For example, the saturation flag may be set to 1 when the set point value reaches or exceeds 100%, and −1 when the set point value is less than or equal to 0%. Then when the saturation flag has been set, and the set point value changes, the valve controller 202 may determine whether the new set point value is more than a threshold amount (e.g., 0.5%) away from the saturated set point value (0% or 100%). For example, the valve controller 202 may determine whether the new set point value is less than 99.5% when the saturated set point value was 100%. The valve controller 202 may determine whether the new set point value is greater than 0.5% when the saturated set point value was 0%. If the new set point value is not more than the threshold amount away from the saturated set point value and the saturation flag has been set, the valve controller 202 may continue to saturate the drive signal. If the new set point value is more than the threshold amount away from the saturated set point value, the valve controller 202 may reset the saturation flag to 0 and set the drive signal to the dynamic relay start point for the supply relay 212 if the new set point value is greater than the valve travel or the dynamic relay start point for the exhaust relay 214 if the new set point value is less than the valve travel. In other implementations, the valve controller 202 may set the drive signal to the calibrated relay start point, or any suitable combination of the dynamic relay start point and the calibrated relay start point.

Figure 11:
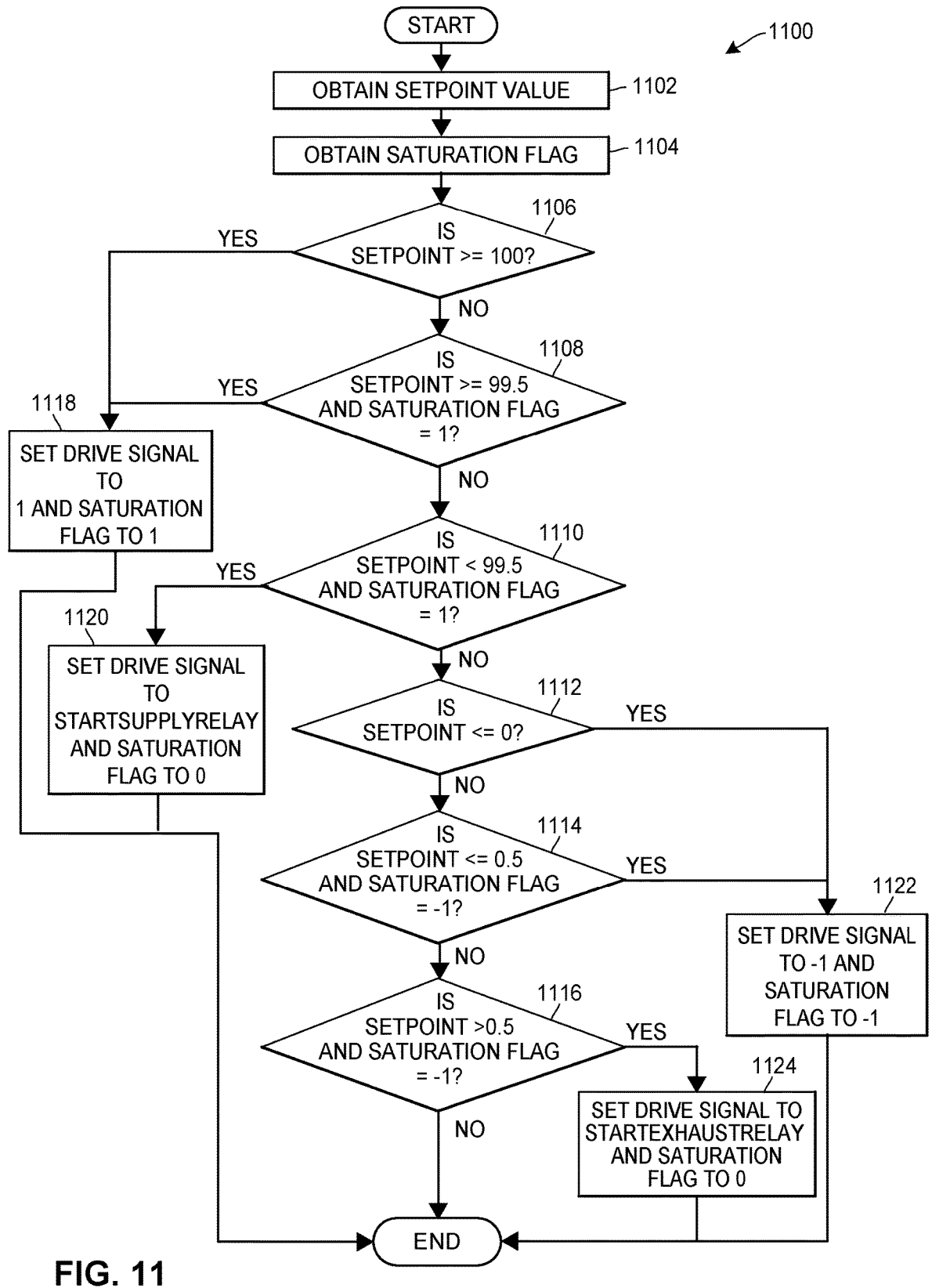
FIG. 11 is a flow diagram of an example method for saturating when the set point value exceeds 100% or is less than 0%, which may be implemented by a valve controller operating in the digital valve positioner of FIG. 1.

FIG. 11 is a flow diagram of an example method 1100 for saturating the drive signal when the set point value exceeds 100% or is less than 0%. The method 1100 may be implemented by the valve controller 202. At block 1102, the valve controller 202 obtains a set point value. Then at block 1104, the valve controller 202 obtains a saturation flag which may be 1 indicating that the set point value reaches or exceeds 100%, −1 indicating that the set point value is less than or equal to 0%, or 0 indicating that the set point value is between 0% and 100%.

At block 1106, the valve controller 202 determines whether the set point value is greater than or equal to a maximum threshold value (e.g., 100%). If the set point value is greater than or equal to the maximum threshold value (e.g., 100%), the valve controller 202 may generate a supply relay PWM current signal corresponding to the maximum threshold value by, for example, setting the drive signal to 1 indicating a 100% duty cycle for the pressure signal to the supply relay 212 and may set the saturation flag to 1 indicating that the supply relay PWM current signal saturated to the maximum threshold value (block 1118).

If the set point value is not greater than or equal to 100% but is less than a threshold amount (e.g., 0.5%) away from the saturated set point value (e.g., 99.5%) and the saturation flag has been set to 1 indicating that the set point value was previously greater than or equal to 100% (block 1108), the valve controller 202 may continue to set the drive signal to 1 indicating a 100% duty cycle for the pressure signal to the supply relay 212 and may continue to set the saturation flag to 1 (block 1118).

On the other hand, if the set point value is more than the threshold amount (e.g., 0.5%) away from the saturated set point value (e.g., 99.5%) and the saturation flag has been set to 1 indicating that the set point value was previously greater than or equal to 100% (block 1110), the valve controller 202 may reset the saturation flag to 0 and generate a supply relay PWM current signal corresponding to the new set point value by, for example, setting the drive signal to the dynamic relay start point for the exhaust relay 214, the calibrated relay start point for the exhaust relay 214, or any suitable combination of the dynamic relay start point and the calibrated relay start point for the exhaust relay 214 (block 1120).

At block 1112, the valve controller 202 determines whether the set point value is less than or equal to a minimum threshold value (e.g., 0%). If the set point value is less than or equal to a minimum threshold value (e.g., 0%), the valve controller 202 may generate an exhaust relay PWM current signal corresponding to the minimum threshold value by, for example, setting the drive signal to −1 indicating a 100% duty cycle for the pressure signal to the exhaust relay 214 and may set the saturation flag to −1 indicating that the exhaust relay PWM current signal saturated to the minimum threshold value (block 1122).

If the set point value is not less than or equal to 0% but is less than a threshold amount (e.g., 0.5%) away from the saturated set point value (e.g., 0.5%) and the saturation flag has been set to −1 indicating that the set point value was previously less than or equal to 0% (block 1114), the valve controller 202 may continue to set the drive signal to −1 indicating a 100% duty cycle for the pressure signal to the exhaust relay 214 and may continue to set the saturation flag to −1 (block 1122).

On the other hand, if the set point value is more than the threshold amount (e.g., 0.5%) away from the saturated set point value (e.g., 0.5%) and the saturation flag has been set to −1 indicating that the set point value was previously less than or equal to 0% (block 1116), the valve controller 202 may reset the saturation flag to 0 and generate an exhaust relay PWM current signal corresponding to the new set point value by, for example, setting the drive signal to the dynamic relay start point for the supply relay 212, the calibrated relay start point for the supply relay 212, or any suitable combination of the dynamic relay start point and the calibrated relay start point for the supply relay 212 (block 1124). Furthermore, if the saturation flag is 0 or has not been set, the valve controller 202 may compare the set point value to the maximum threshold value (e.g., 100%) and the minimum threshold value (e.g., 0%) to determine the supply relay PWM current signal and the exhaust relay PWM current signal to generate.

Anti-Windup on Loss of Supply Pressure

In some scenarios, the supply pressure source in the digital positioner 14 does not provide enough pressure to move the actuator 12 toward the set point value. In these scenarios, the valve controller 202 may continue to increase the drive signal to provide additional pressure to the actuator 12. For example, as described above with reference to FIGS. 7A-7B, if the change in valve travel over a period (0.070 seconds) is less than a threshold speed (e.g., 1.43% per second), the valve controller 202 may increase the drive signal. When the supply pressure provided by the supply pressure source returns to a pressure value that allows the valve travel to reach the set point value, the valve controller 202 may experience a wind-up condition where the valve travel changes too quickly which may cause the digital positioner 14 to overshoot the set point value.

To prevent the wind-up condition from occurring, the valve controller 202 may determine whether the valve travel changes by more than a threshold amount in a period (e.g., ±1% per period) and whether the drive signal exceeds a threshold drive signal (e.g., ±0.98). If the valve travel changes by more than the threshold amount in the period and the drive signal exceeds the threshold drive signal, the valve controller 202 may reset the dynamic relay start point for the supply relay 212 or the exhaust relay 214 to 0.

Figure 12:
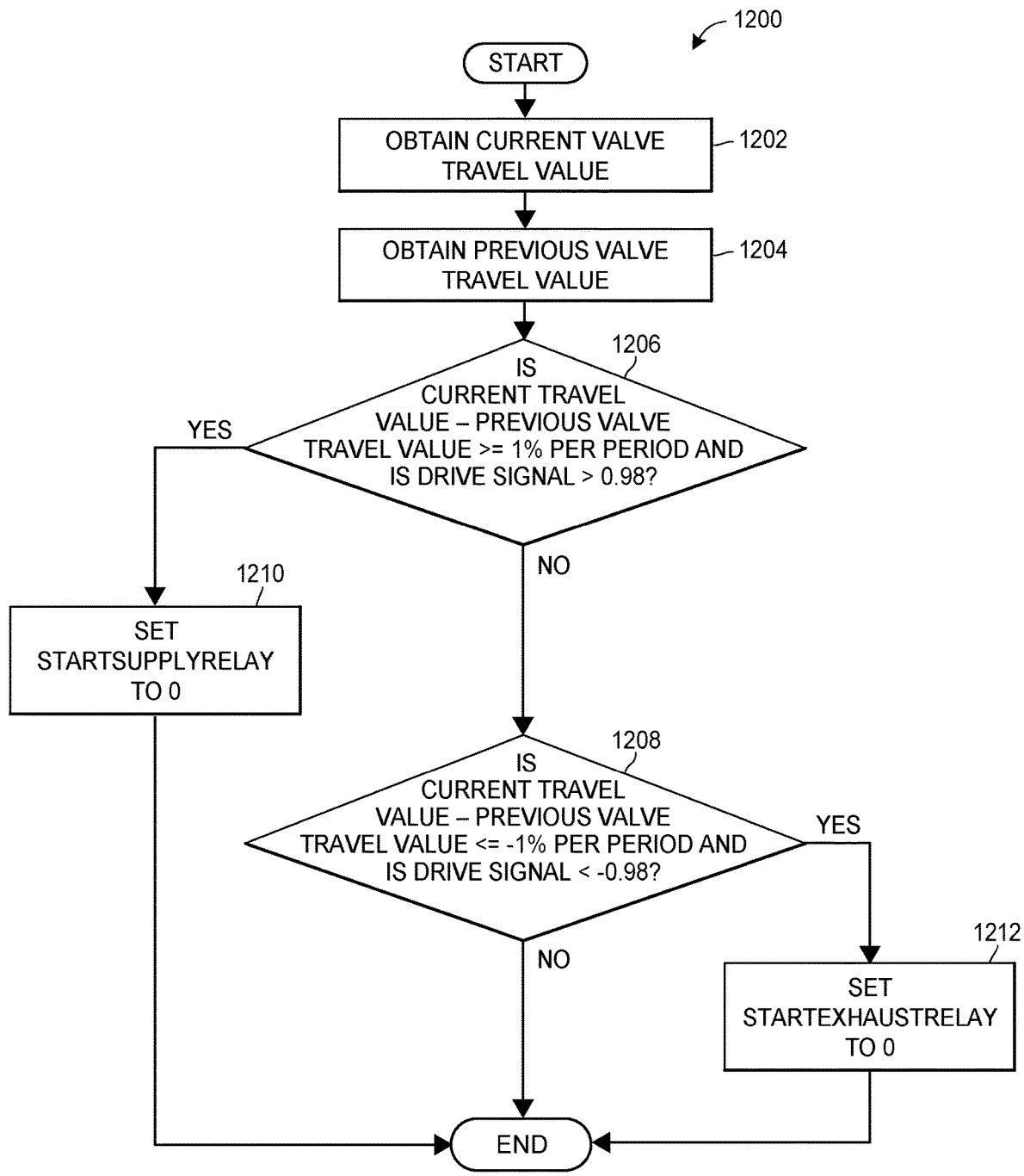
FIG. 12 is a flow diagram of an example method for preventing overshooting from a wind-up condition, which may be implemented by a valve controller operating in the digital valve positioner of FIG. 1.

FIG. 12 is a flow diagram of an example method 1200 for preventing overshooting from a wind-up condition. The method 1200 may be implemented by the valve controller 202. At blocks 1202 and 1204, the valve controller 202 obtains valve travel values for the valve from the valve travel sensor 216. The valve travel sensor 216 may provide a current valve travel value each period (e.g., 0.070 seconds).

At block 1206, the valve controller 202 determines whether the difference between the current valve travel and the valve travel from the previous period is greater than or equal to a first threshold amount (e.g., 1%), and whether the drive signal exceeds a first threshold drive signal (e.g., 0.98). If the difference between the current valve travel and the valve travel from the previous period is greater than or equal to the first threshold amount and the drive signal exceeds the first threshold drive signal, the valve controller 202 may reset the dynamic relay start point for the supply relay 212 to zero (block 1210).

At block 1208, the valve controller 202 determines whether the difference between the current valve travel and the valve travel from the previous period is less than or equal to (i.e., more negative than) a second threshold amount (e.g., −1%), and whether the drive signal is less than (i.e., more negative than) a second threshold drive signal (e.g., −0.98). If the difference between the current valve travel and the valve travel from the previous period is less than or equal to the second threshold amount and the drive signal is less than the second threshold drive signal, the valve controller 202 may reset the dynamic relay start point for the exhaust relay 214 to zero (block 1212).

Wrong Way Corrector

In some scenarios, the valve may be travelling in the opposite direction of the set point value. For example, the valve travel may be increasing over time when the set point value is less than the valve travel or the valve travel may be decreasing over time when the set point value is greater than the valve travel. The valve controller 202 may detect that the difference between the set point value and the valve travel is increasing over time. Thus, the valve is moving in the wrong direction, and the valve controller 202 reverses the direction of movement of the valve.

Figure 13:
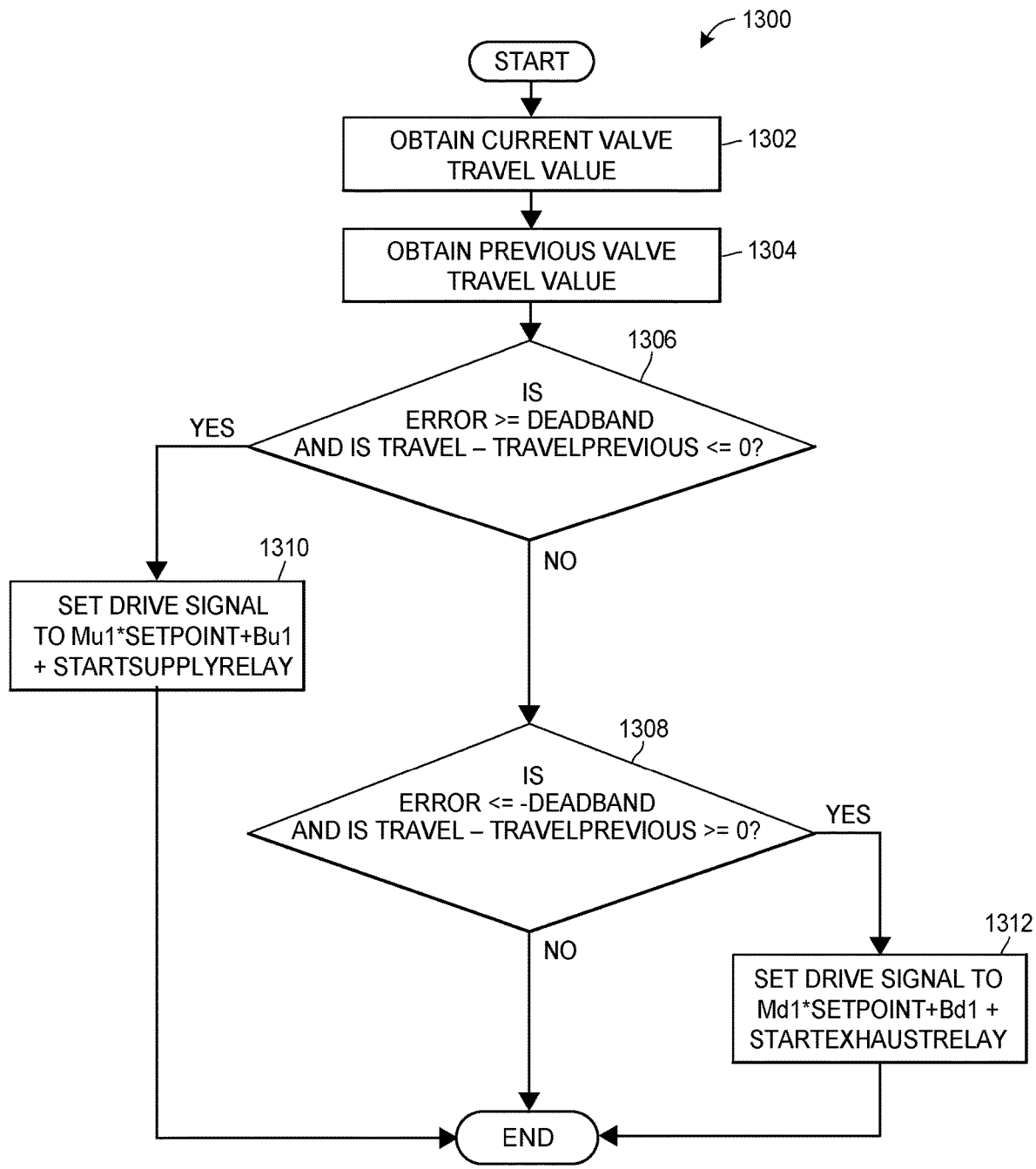
FIG. 13 is a flow diagram of an example method for reversing the direction of the change in valve travel upon detecting that the valve is traveling away from the set point value, which may be implemented by a valve controller operating in the digital valve positioner of FIG. 1.

FIG. 13 is a flow diagram of an example method 1300 for reversing the direction of the change in valve travel upon detecting that the valve is traveling away from the set point value. The method 1300 may be implemented by the valve controller 202. At blocks 1302 and 1304, the valve controller 202 obtains valve travel values for the valve from the valve travel sensor 216. The valve travel sensor 216 may provide a current valve travel value each period (e.g., 0.070 seconds).

At block 1306, the valve controller 202 determines whether the valve is travelling in the opposite direction of the set point value by determining whether the valve travel is decreasing over time (e.g., the difference between the current valve travel and the valve travel in the previous period is less than 0), and whether the valve travel is less than the set point value or the difference between the set point value and the valve travel is greater than a dead band value. If the valve travel is decreasing over time and the valve travel is less than the set point value, the valve controller 202 may set the drive signal to the dynamic relay start point for the supply relay 212, the calibrated relay start point for the supply relay 212 by for example applying the set point value to the model, or any suitable combination of the dynamic relay start point and the calibrated relay start point for the supply relay 212 (e.g., $M_{u1}$*set point value+$B_{u1}$+startsupplyrelay) (block 1310).

At block 1308, the valve controller 202 determines whether the valve is travelling in the opposite direction of the set point value by determining whether the valve travel is increasing over time (e.g., the difference between the current valve travel and the valve travel in the previous period is greater than 0), and whether the valve travel is greater than the set point value or the difference between the set point value and the valve travel is less than (i.e., more negative than) a negative dead band value. If the valve travel is increasing over time and the valve travel is greater than the set point value, the valve controller 202 may set the drive signal to the dynamic relay start point for the exhaust relay 214, the calibrated relay start point for the exhaust relay 214 by for example applying the set point value to the model, or any suitable combination of the dynamic relay start point and the calibrated relay start point for the exhaust relay 214 (e.g., $M_{d1}$*set point value+$B_{d1}$+startexhaustrelay) (block 1310).

Embodiments of the techniques described in the present disclosure may include any number of the following aspects, either alone or combination:

1. A digital positioner for a valve comprising: a valve controller including: one or more processors; and a non-transitory computer-readable memory coupled to the one or more processors and storing instructions thereon that, when executed by the one or more processors, cause the valve controller to: obtain a set point value for a valve travel of a valve or an amount of pressure at the valve; generate a drive signal as a function of the set point value, wherein the drive signal is adjusted in accordance with a rate of change of the valve travel or the valve pressure over a time period; and generate a pulse-width modulated current signal in accordance with the drive signal; and a current-to-pressure converter configured to receive the pulse-width modulated current signal from the valve controller, convert the pulse-width modulated current signal to a pulse-width modulated pressure signal, and provide the pulse-width modulated pressure signal to a pneumatic actuator in the valve to adjust a position of the valve.

2. The digital positioner of aspect 1, wherein the instructions cause the valve controller to generate a first pulse-width modulated current signal and a second pulse-width modulated current signal, wherein the current-to-pressure converter includes a first current-to-pressure converter configured to receive the first pulse-width modulated current signal and convert the first pulse-width modulated current signal to a first pulse-width modulated pressure signal, and a second current-to-pressure converter configured to receive the second pulse-width modulated current signal and convert the second pulse-width modulated current signal to a second pulse-width modulated pressure signal, and further comprising: a supply relay configured to receive the first pulse-width modulated pressure signal from the first current-to-pressure converter, and provide the first pulse-width modulated pressure signal to a supply port in the pneumatic actuator in the valve to increase the valve travel or the amount of pressure for the valve; and an exhaust relay configured to receive the second pulse-width modulated pressure signal from the second current-to-pressure converter, and vent the pneumatic actuator in the valve in accordance with the second pulse-width modulated pressure signal to decrease the valve travel or the amount of pressure for the valve.

3. The digital positioner of either one of aspect 1 or aspect 2, wherein the instructions further cause the valve controller to: generate a first pulse-width modulated current signal in accordance with the drive signal; generate a second pulse-width modulated current signal in accordance with the drive signal; provide the first pulse-width modulated current signal to the first current-to-pressure converter; and provide the second pulse-width modulated current signal to the second current-to-pressure converter.

4. The digital positioner of any of the preceding aspects, further comprising: a valve travel sensor configured to obtain a current valve travel value for the valve and provide the current valve travel value to the valve controller.

5. The digital positioner of any of the preceding aspects, wherein the instructions further cause the valve controller to: generate the drive signal based at least in part on a dynamic relay start point, the drive signal indicating the first pulse-width modulated current signal and the second pulse-width modulated current signal; determine a change in the valve travel for the valve or the amount of pressure at the valve over a time period; and in response to determining that the drive signal exceeds a first threshold drive signal or is less than a second threshold drive signal and that the change in valve travel or valve pressure exceeds a threshold amount, reset the dynamic relay start point.

6. The digital positioner of any of the preceding aspects, wherein to generate a drive signal as a function of the set point value, wherein the drive signal is adjusted in accordance with a rate of change of the valve travel or the valve pressure over a time period, the instructions cause the valve controller to: obtain a threshold dead band value for the valve travel or valve pressure; identify a dead band region for the valve travel or valve pressure based on the threshold dead band value for the valve travel or valve pressure and the set point value; compare the rate of change of the valve travel or valve pressure over the time period to a threshold speed; and decrease the value for the drive signal in response to determining that the rate of change of the valve travel or valve pressure over the time period exceeds the threshold speed and the valve travel or valve pressure is in the dead band region.

7. The digital positioner of any of the preceding aspects, wherein the threshold speed includes a first threshold speed for the supply relay and a second threshold speed for the exhaust relay.

8. The digital positioner of any of the preceding aspects, wherein the instructions cause the valve controller to: decrease the value for the drive signal by a first predetermined amount in response to determining that the valve travel is increasing over the time period, the rate of change of the valve travel or valve pressure over the time period exceeds the first threshold speed for the supply relay, and the valve travel or valve pressure is in the dead band region.

9. The digital positioner of any of the preceding aspects, wherein the instructions cause the valve controller to: decrease the value for the drive signal by a second predetermined amount in response to determining that the valve travel is increasing over the time period, the rate of change of the valve travel or valve pressure over the time period exceeds the first threshold speed for the supply relay, and the valve travel or valve pressure is above the dead band region.

10. The digital positioner of any of the preceding aspects, wherein the instructions cause the valve controller to: increase the value for the drive signal by a third predetermined amount in response to determining that the valve travel is increasing over the time period, and the rate of change of the valve travel or valve pressure over the time period is more than a threshold amount below the first threshold speed for the supply relay.

11. The digital positioner of any of the preceding aspects, wherein the instructions cause the valve controller to: increase the value for the drive signal by a first predetermined amount in response to determining that the valve travel is decreasing over the time period, a magnitude of the rate of change of the valve travel or valve pressure over the time period exceeds a magnitude of the second threshold speed for the exhaust relay, and the valve travel or valve pressure is in the dead band region.

12. The digital positioner of any of the preceding aspects, wherein the instructions cause the valve controller to: increase the value for the drive signal by a second predetermined amount in response to determining that the valve travel is decreasing over the time period, the magnitude of the rate of change of the valve travel or valve pressure over the time period exceeds the magnitude of the second threshold speed for the exhaust relay, and the valve travel or valve pressure is above the dead band region.

13. The digital positioner of any of the preceding aspects, wherein the instructions cause the valve controller to: decrease the value for the drive signal by a third predetermined amount in response to determining that the valve travel is decreasing over the time period, and the magnitude the rate of change of the valve travel or valve pressure over the time period is more than a threshold amount below the magnitude of the second threshold speed for the exhaust relay.

14. The digital positioner of any of the preceding aspects, wherein the instructions cause the valve controller to: compare a current valve travel or valve pressure value to a previous valve travel or valve pressure value within the time period; and in response to determining that a difference between the current valve travel or valve pressure value and the previous valve travel or valve pressure value within the time period exceeds a threshold amount, reset the drive signal to zero.

15. A digital positioner for a valve comprising: a valve controller including: one or more processors; and a non-transitory computer-readable memory coupled to the one or more processors, and storing thereon instructions that, when executed by the one or more processors, cause the valve controller to: obtain a set point value for a valve travel of a valve or an amount of pressure at the valve; generate a drive signal by calibrating the digital positioner using a plurality of predetermined set points to generate a model for determining the drive signal as a function of the set point value, and applying the set point value to the model to determine a value for the drive signal; and generate a pulse-width modulated current signal in accordance with the drive signal; and a current-to-pressure converter configured to receive the pulse-width modulated current signal from the valve controller, convert the pulse-width modulated current signal to a pulse-width modulated pressure signal, and provide the pulse-width modulated pressure signal to a pneumatic actuator in the valve to adjust a position of the valve.

16. The digital positioner of aspect 15, further comprising: a valve travel sensor configured to obtain a current valve travel value for the valve and provide the current valve travel value to the valve controller.

17. The digital positioner of either one of aspect 15 or aspect 16, wherein to generate a model for determining the drive signal as a function of the set point value, the instructions cause the valve controller to: modulate set point values for each of the plurality of predetermined set points; determine a change in drive signals across the modulated set point values; and generate the model based on the change in drive signals across the modulated set point values.

18. The digital positioner of any one of aspects 15-17, wherein the model is a line of best fit having a slope and offset based on the drive signals as a function of the modulated set point values.

19. The digital positioner of any one of aspects 15-18, wherein to apply the set point value to the model to determine a value for the drive signal, the instructions cause the valve controller to: apply the slope and the offset to the set point value to determine the value for the drive signal.

20. A valve controller comprising: one or more processors; and a non-transitory computer-readable memory coupled to the one or more processors, and storing thereon instructions that, when executed by the one or more processors, cause the valve controller to: obtain a set point value for a valve travel of a valve or an amount of pressure at the valve; obtain a threshold dead band value for the valve travel or the amount of pressure; adjust the threshold dead band value based on changes in valve travel values or changes in pressure values over time; generate a drive signal based on the set point value and the adjusted threshold dead band value; generate a pulse-width modulated current signal in accordance with the drive signal; and provide the pulse-width modulated current signal to a current-to-pressure converter that converts the pulse-width modulated current signal to a pulse-width modulated pressure signal and provides the pulse-width modulated pressure signal to a pneumatic actuator in the valve to adjust a position of the valve.

21. The valve controller of aspect 20, wherein to adjust the threshold dead band value based on changes in valve travel values or changes in pressure values over time, the instructions cause the valve controller to: compare a difference between the set point value and a current valve travel or valve pressure value to the threshold dead band value; determine that the current valve travel or valve pressure value is within a dead band region of the set point value when the difference between the set point value and the current valve travel or valve pressure value is less than the threshold dead band value; and in response to determining that the current valve travel or valve pressure value is within the dead band region, adjust the threshold dead band value over time based on a difference between a subsequent valve travel or valve pressure value and the current valve travel or valve pressure value.

22. The valve controller of either one of aspect 20 or 21, wherein to adjust the threshold dead band value over time, the instructions cause the valve controller to: increase the threshold dead band value in response to determining that the subsequent valve travel or valve pressure value exceeds a sum of the set point value and the threshold dead band value.

23. The valve controller of any one of aspects 20-22, wherein to adjust the threshold dead band value over time, the instructions cause the valve controller to: compare the difference between the set point value and the subsequent valve travel or valve pressure value to the threshold dead band value; and in response to determining that the difference between the set point value and the subsequent valve travel or valve pressure value is more than half of the threshold dead band value, decrease the threshold dead band value.

24. The valve controller of any one of aspects 20-23, wherein the instructions cause the valve controller to: obtain a plurality of subsequent valve travel or valve pressure values after threshold periods of time; for each of the plurality of subsequent valve travel or valve pressure values, increase a counter in response to determining that a difference between the set point value and subsequent valve travel or valve pressure value is more than half of the threshold dead band value; and decrease the threshold dead band value in response to determining that the counter exceeds a threshold number.

25. A digital positioner for a valve comprising: a valve controller including: one or more processors; and a non-transitory computer-readable memory coupled to the one or more processors and storing instructions thereon that, when executed by the one or more processors, cause the valve controller to: obtain a set point value for a valve travel of a valve or an amount of pressure at the valve; compare the set point value to a maximum threshold value or a minimum threshold value; in response to determining that the set point value exceeds the maximum threshold value or is less than the minimum threshold value, generate a drive signal corresponding to the maximum threshold value or the minimum threshold value; set a saturation flag indicating that the drive signal saturated to the maximum threshold value or the minimum threshold value; and generate a pulse-width modulated current signal in accordance with the drive signal; and a current-to-pressure converter configured to receive the pulse-width modulated current signal from the valve controller, convert the pulse-width modulated current signal to a pulse-width modulated pressure signal, and provide the pulse-width modulated pressure signal to a pneumatic actuator in the valve to adjust a position of the valve.

26. The digital positioner of aspect 25, wherein the instructions cause the valve controller to: compare the set point value to the maximum threshold value; and in response to determining that the set point value exceeds the maximum threshold value: generate the drive signal corresponding to the maximum threshold value; and set the saturation flag indicating that the drive signal saturated to the maximum threshold value.

27. The digital positioner of either one of aspect 25 or aspect 26, wherein the instructions cause the valve controller to: obtain a new set point value; in a first instance, in response to determining that the saturation flag has been set indicating that the drive signal saturated to the maximum threshold value: compare the new set point value to a threshold amount below the maximum threshold value; and in response to determining that the new set point value is less than the threshold amount below the maximum threshold value, reset the saturation flag, and generate a drive signal corresponding to the new set point value; and in a second instance, in response to determining that the saturation flag has not been set, compare the new set point value to the maximum threshold value to determine the drive signal to generate.

28. The digital positioner of any one of aspects 25-27, wherein the instructions cause the valve controller to: compare the set point value to the minimum threshold value; and in response to determining that the set point value is less than the minimum threshold value: generate the drive signal corresponding to the minimum threshold value; and set the saturation flag indicating that the drive signal saturated to the minimum threshold value.

29. The digital positioner of any one of aspects 25-28, wherein the instructions cause the valve controller to: obtain a new set point value; in a first instance, in response to determining that the saturation flag has been set indicating that the pulse-width modulated current signal saturated to the minimum threshold value: compare the new set point value to a threshold amount above the minimum threshold value; and in response to determining that the new set point value is more than the threshold amount above the minimum threshold value, reset the saturation flag, and generate a drive signal corresponding to the new set point value; and in a second instance, in response to determining that the saturation flag has not been set, compare the new set point value to the minimum threshold value to determine the drive signal to generate.

30. The digital positioner of any one of aspects 25-29, wherein the instructions cause the valve controller to generate a first pulse-width modulated current signal and a second pulse-width modulated current signal, wherein the current-to-pressure converter includes a first current-to-pressure converter configured to receive the first pulse-width modulated current signal and convert the first pulse-width modulated current signal to a first pulse-width modulated pressure signal, and a second current-to-pressure converter configured to receive the second pulse-width modulated current signal and convert the second pulse-width modulated current signal to a second pulse-width modulated pressure signal, and further comprising: a supply relay configured to receive the first pulse-width modulated pressure signal from the first current-to-pressure converter, and provide the first pulse-width modulated pressure signal to a supply port in the pneumatic actuator in the valve to increase the valve travel or the amount of pressure for the valve; and an exhaust relay configured to receive the second pulse-width modulated pressure signal from the second current-to-pressure converter, and vent the pneumatic actuator in the valve in accordance with the second pulse-width modulated pressure signal to decrease the valve travel or the amount of pressure for the valve.

31. The digital positioner of any one of aspects 25-30, wherein the instructions further cause the valve controller to: generate a first pulse-width modulated current signal in accordance with the drive signal; generate a second pulse-width modulated current signal in accordance with the drive signal; provide the first pulse-width modulated current signal to the first current-to-pressure converter; and provide the second pulse-width modulated current signal to the second current-to-pressure converter.

32. The digital positioner of any one of aspects 25-31, further comprising: a valve travel sensor configured to obtain a current valve travel value for the valve and provide the current valve travel value to the valve controller.

33. A valve controller comprising: one or more processors; and a non-transitory computer-readable memory coupled to the one or more processors, and storing thereon instructions that, when executed by the one or more processors, cause the valve controller to: obtain a set point value for a valve travel of a valve or an amount of pressure at the valve; identify a change in the valve travel or the amount of pressure at the valve such that a difference between the valve travel or the amount of pressure at the valve and the set point value is increasing over time; generate a drive signal that reverses a direction of the valve travel; generate a pulse-width modulated current signal in accordance with the drive signal; and provide the pulse-width modulated current signal to a current-to-pressure converter that converts the pulse-width modulated current signal to a pulse-width modulated pressure signal and provides the pulse-width modulated pressure signal to a pneumatic actuator in the valve to adjust a position of the valve.

34. The valve controller of aspect 33, wherein to generate a drive signal that reverses a direction of the valve travel, the instructions cause the valve controller to: calibrate the digital positioner using a plurality of predetermined set points to generate a model for determining the pulse-width modulated current signal as a function of the set point value; and apply the set point value to the model to determine a value for the drive signal.

35. The valve controller of either one of aspect 33 or aspect 34, wherein the instructions further cause the valve controller to: generate a first pulse-width modulated current signal in accordance with the drive signal; generate a second pulse-width modulated current signal in accordance with the drive signal; provide a representation of the first pulse-width modulated current signal to a supply port in the pneumatic actuator in the valve to increase the valve travel or the amount of pressure for the valve; and provide a representation of the second pulse-width modulated current signal to vent the pneumatic actuator in the valve in accordance with the representation of the second pulse-width modulated current signal to decrease the valve travel or the amount of pressure for the valve.

36. The valve controller of any one of aspects 33-35, wherein the instructions further cause the valve controller to: determine that the set point value is less than a current valve travel or valve pressure value; and in response to determining that the set point value is less than the current valve travel or valve pressure value, generate a drive signal that causes the pneumatic actuator in the valve to vent.

37. The valve controller of any one of aspects 33-36, wherein the instructions further cause the valve controller to: determine that the set point value is greater than a current valve travel or valve pressure value; and in response to determining that the set point value is greater than the current valve travel or valve pressure value, generate a drive signal that causes the supply port in the pneumatic actuator in the valve to increase the valve travel or the amount of pressure for the valve.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A valve controller comprising:
   one or more processors; and
   a non-transitory computer-readable memory coupled to the one or more processors, and storing thereon instructions that, when executed by the one or more processors, cause the valve controller to:
     obtain a set point value for a valve travel of a valve or an amount of pressure at the valve;
     obtain a threshold dead band value for the valve travel or the amount of pressure;
     adjust the threshold dead band value based on changes in valve travel values or changes in pressure values over time;
     generate a drive signal based on the set point value and the adjusted threshold dead band value;
     generate a pulse-width modulated current signal in accordance with the drive signal; and
     provide the pulse-width modulated current signal to a current-to-pressure converter that converts the pulse-width modulated current signal to a pulse-width modulated pressure signal and provides the pulse-width modulated pressure signal to a pneumatic actuator in the valve to adjust a position of the valve.

2. The valve controller of claim 1, wherein to adjust the threshold dead band value based on changes in valve travel values or changes in pressure values over time, the instructions cause the valve controller to:
   compare a difference between the set point value and a current valve travel or valve pressure value to the threshold dead band value;
   determine that the current valve travel or valve pressure value is within a dead band region of the set point value when the difference between the set point value and the current valve travel or valve pressure value is less than the threshold dead band value; and
   in response to determining that the current valve travel or valve pressure value is within the dead band region, adjust the threshold dead band value over time based on a difference between a subsequent valve travel or valve pressure value and the current valve travel or valve pressure value.

3. The valve controller of claim 2, wherein to adjust the threshold dead band value over time, the instructions cause the valve controller to:
   increase the threshold dead band value in response to determining that the subsequent valve travel or valve pressure value exceeds a sum of the set point value and the threshold dead band value.

4. The valve controller of claim 2, wherein to adjust the threshold dead band value over time, the instructions cause the valve controller to:
   compare the difference between the set point value and the subsequent valve travel or valve pressure value to the threshold dead band value; and
   in response to determining that the difference between the set point value and the subsequent valve travel or valve pressure value is more than half of the threshold dead band value, decrease the threshold dead band value.

5. The valve controller of claim 2, wherein the instructions cause the valve controller to:
   obtain a plurality of subsequent valve travel or valve pressure values after threshold periods of time;
   for each of the plurality of subsequent valve travel or valve pressure values, increase a counter in response to determining that a difference between the set point value and subsequent valve travel or valve pressure value is more than half of the threshold dead band value; and
   decrease the threshold dead band value in response to determining that the counter exceeds a threshold number.

6. A digital positioner for a valve comprising:
   a valve controller including:
     one or more processors; and
     a non-transitory computer-readable memory coupled to the one or more processors and storing instructions thereon that, when executed by the one or more processors, cause the valve controller to:
       obtain a set point value for a valve travel of a valve or an amount of pressure at the valve;
       compare the set point value to a maximum threshold value or a minimum threshold value;
       in response to determining that the set point value exceeds the maximum threshold value or is less than the minimum threshold value, generate a drive signal corresponding to the maximum threshold value or the minimum threshold value;
       set a saturation flag indicating that the drive signal saturated to the maximum threshold value or the minimum threshold value; and
       generate a pulse-width modulated current signal in accordance with the drive signal; and
   a current-to-pressure converter configured to receive the pulse-width modulated current signal from the valve controller, convert the pulse-width modulated current signal to a pulse-width modulated pressure signal, and provide the pulse-width modulated pressure signal to a pneumatic actuator in the valve to adjust a position of the valve.

7. The digital positioner of claim 6, wherein the instructions cause the valve controller to:
compare the set point value to the maximum threshold value; and
in response to determining that the set point value exceeds the maximum threshold value:
generate the drive signal corresponding to the maximum threshold value; and
set the saturation flag indicating that the drive signal saturated to the maximum threshold value.

8. The digital positioner of claim 7, wherein the instructions cause the valve controller to:
obtain a new set point value;
in a first instance, in response to determining that the saturation flag has been set indicating that the drive signal saturated to the maximum threshold value:
compare the new set point value to a threshold amount below the maximum threshold value; and
in response to determining that the new set point value is less than the threshold amount below the maximum threshold value, reset the saturation flag, and generate a drive signal corresponding to the new set point value; and
in a second instance, in response to determining that the saturation flag has not been set, compare the new set point value to the maximum threshold value to determine the drive signal to generate.

9. The digital positioner of claim 6, wherein the instructions cause the valve controller to:
compare the set point value to the minimum threshold value; and
in response to determining that the set point value is less than the minimum threshold value:
generate the drive signal corresponding to the minimum threshold value; and
set the saturation flag indicating that the drive signal saturated to the minimum threshold value.

10. The digital positioner of claim 9, wherein the instructions cause the valve controller to:
obtain a new set point value;
in a first instance, in response to determining that the saturation flag has been set indicating that the pulse-width modulated current signal saturated to the minimum threshold value:
compare the new set point value to a threshold amount above the minimum threshold value; and
in response to determining that the new set point value is more than the threshold amount above the minimum threshold value, reset the saturation flag, and generate a drive signal corresponding to the new set point value; and
in a second instance, in response to determining that the saturation flag has not been set, compare the new set point value to the minimum threshold value to determine the drive signal to generate.

11. The digital positioner of claim 6, wherein the instructions cause the valve controller to generate a first pulse-width modulated current signal and a second pulse-width modulated current signal, wherein the current-to-pressure converter includes a first current-to-pressure converter configured to receive the first pulse-width modulated current signal and convert the first pulse-width modulated current signal to a first pulse-width modulated pressure signal, and a second current-to-pressure converter configured to receive the second pulse-width modulated current signal and convert the second pulse-width modulated current signal to a second pulse-width modulated pressure signal, and further comprising:
a supply relay configured to receive the first pulse-width modulated pressure signal from the first current-to-pressure converter, and provide the first pulse-width modulated pressure signal to a supply port in the pneumatic actuator in the valve to increase the valve travel or the amount of pressure for the valve; and
an exhaust relay configured to receive the second pulse-width modulated pressure signal from the second current-to-pressure converter, and vent the pneumatic actuator in the valve in accordance with the second pulse-width modulated pressure signal to decrease the valve travel or the amount of pressure for the valve.

12. The digital positioner of claim 11, wherein the instructions further cause the valve controller to:
generate a first pulse-width modulated current signal in accordance with the drive signal;
generate a second pulse-width modulated current signal in accordance with the drive signal;
provide the first pulse-width modulated current signal to the first current-to-pressure converter; and
provide the second pulse-width modulated current signal to the second current-to-pressure converter.

13. The digital positioner of claim 6, further comprising:
a valve travel sensor configured to obtain a current valve travel value for the valve and provide the current valve travel value to the valve controller.

14. A valve controller comprising:
one or more processors; and
a non-transitory computer-readable memory coupled to the one or more processors, and storing thereon instructions that, when executed by the one or more processors, cause the valve controller to:
obtain a set point value for a valve travel of a valve or an amount of pressure at the valve;
identify a change in the valve travel or the amount of pressure at the valve such that a difference between the valve travel or the amount of pressure at the valve and the set point value is increasing over time;
generate a drive signal that reverses a direction of the valve travel;
generate a pulse-width modulated current signal in accordance with the drive signal; and
provide the pulse-width modulated current signal to a current-to-pressure converter that converts the pulse-width modulated current signal to a pulse-width modulated pressure signal and provides the pulse-width modulated pressure signal to a pneumatic actuator in the valve to adjust a position of the valve.

15. The valve controller of claim 14, wherein to generate a drive signal that reverses a direction of the valve travel, the instructions cause the valve controller to:
calibrate the digital positioner using a plurality of predetermined set points to generate a model for determining the pulse-width modulated current signal as a function of the set point value; and
apply the set point value to the model to determine a value for the drive signal.

16. The valve controller of claim 14, wherein the instructions further cause the valve controller to:
generate a first pulse-width modulated current signal in accordance with the drive signal;

generate a second pulse-width modulated current signal in accordance with the drive signal;

provide a representation of the first pulse-width modulated current signal to a supply port in the pneumatic actuator in the valve to increase the valve travel or the amount of pressure for the valve; and provide a representation of the second pulse-width modulated current signal to vent the pneumatic actuator in the valve in accordance with the representation of the second pulse-width modulated current signal to decrease the valve travel or the amount of pressure for the valve.

17. The valve controller of claim 14, wherein the instructions further cause the valve controller to:

determine that the set point value is less than a current valve travel or valve pressure value; and in response to determining that the set point value is less than the current valve travel or valve pressure value, generate a drive signal that causes the pneumatic actuator in the valve to vent.

18. The valve controller of claim 14, wherein the instructions further cause the valve controller to:

determine that the set point value is greater than a current valve travel or valve pressure value; and in response to determining that the set point value is greater than the current valve travel or valve pressure value, generate a drive signal that causes the supply port in the pneumatic actuator in the valve to increase the valve travel or the amount of pressure for the valve.

\* \* \* \* \*

UNITED STATES PATENT AND TRADEMARK OFFICE
CERTIFICATE OF CORRECTION

| | |
|---|---|
| PATENT NO. | : 11,368,120 B2 |
| APPLICATION NO. | : 16/881798 |
| DATED | : June 21, 2022 |
| INVENTOR(S) | : George W. Gassman |

It is certified that error appears in the above-identified patent and that said Letters Patent is hereby corrected as shown below:

In the Drawings

At Fig. 7A, Sheet 10 of 18, Tag "710", Line 7, "0.05" should be -- 0.05? --

At Fig. 7B, Sheet 11 of 18, Tag "760", Line 9, "-0.05" should be -- -0.05? --

Signed and Sealed this
Tenth Day of October, 2023

Katherine Kelly Vidal
*Director of the United States Patent and Trademark Office*